(12) United States Patent
Li et al.

(10) Patent No.: US 12,463,200 B2
(45) Date of Patent: Nov. 4, 2025

(54) MEMBRANE-FREE Zn/MnO₂ FLOW BATTERY FOR LARGE-SCALE ENERGY STORAGE

(71) Applicant: THE BOARD OF TRUSTEES OF THE LELAND STANFORD JUNIOR UNIVERSITY, Stanford, CA (US)

(72) Inventors: Guodong Li, Stanford, CA (US); Wei Chen, Stanford, CA (US); Yi Cui, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 802 days.

(21) Appl. No.: 17/604,343

(22) PCT Filed: Apr. 14, 2020

(86) PCT No.: PCT/US2020/028141
§ 371 (c)(1),
(2) Date: Oct. 15, 2021

(87) PCT Pub. No.: WO2020/214604
PCT Pub. Date: Oct. 22, 2020

(65) Prior Publication Data
US 2022/0199971 A1    Jun. 23, 2022

Related U.S. Application Data

(60) Provisional application No. 62/835,954, filed on Apr. 18, 2019.

(51) Int. Cl.
*H01M 4/24*    (2006.01)
*H01M 4/62*    (2006.01)
*H01M 10/36*   (2010.01)

(52) U.S. Cl.
CPC ........... *H01M 4/244* (2013.01); *H01M 4/625* (2013.01); *H01M 10/36* (2013.01); *H01M 2300/0005* (2013.01)

(58) Field of Classification Search
CPC ...... H01M 4/244; H01M 4/625; H01M 10/36; H01M 2300/0005
See application file for complete search history.

(56) References Cited

U.S. PATENT DOCUMENTS 6,187,475 B1 * 2/2001 Oh .......................... H01M 6/04
                                                         429/232
8,951,673 B2   2/2015 Wessells et al.
(Continued)

FOREIGN PATENT DOCUMENTS

| CN | 107093773 A | * | 8/2017 | ............ H01M 10/04 |
| CN | 108134141 A | * | 6/2018 | ........... H01M 10/365 |
| WO | WO-2018071469 A1 | * | 4/2018 | ........... H01M 10/365 |

OTHER PUBLICATIONS

CN_108134141_ MT (Year: 2018).*
(Continued)

*Primary Examiner* — Alexander Usyatinsky
(74) *Attorney, Agent, or Firm* — Foley & Lardner LLP

(57) ABSTRACT

This application is a 371 National Stage of International Application No. PCT/US2020/028141, filed Apr. 14, 2020, which claims the benefit of U.S. Provisional Patent Application No. 62/835,954, filed Apr. 18, 2019, each of which are incorporated by reference herein in their entirety.

16 Claims, 30 Drawing Sheets

(56) References Cited

U.S. PATENT DOCUMENTS

| | | | |
|---|---|---|---|
| 2005/0221169 A1 | 10/2005 | Sotomura | |
| 2012/0045680 A1 | 2/2012 | Dong et al. | |
| 2012/0135282 A1* | 5/2012 | La Mantia | H01M 6/34 429/70 |
| 2016/0181640 A1* | 6/2016 | Kaku | H01M 8/08 429/498 |
| 2016/0301096 A1* | 10/2016 | Zhamu | H01G 11/24 |
| 2017/0200966 A1* | 7/2017 | Chiang | H01M 12/08 |
| 2019/0006701 A1 | 1/2019 | Dai et al. | |

OTHER PUBLICATIONS

CN107093773A_MT (Year: 2017).*
Foreign Search Report on PCT PCT/US2020/028141 Dtd Jul. 17, 2020.

* cited by examiner

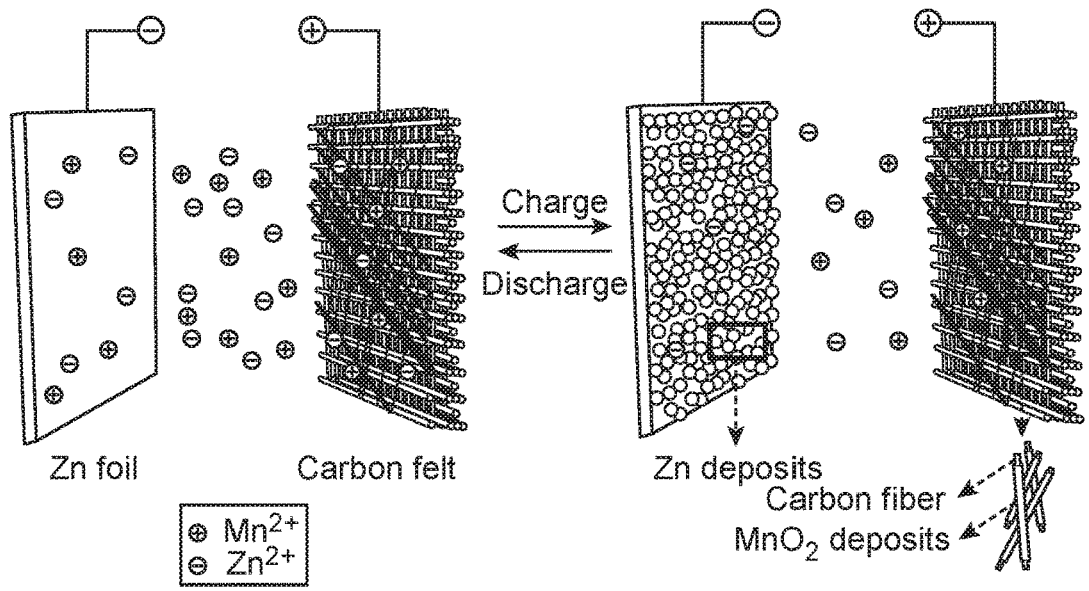
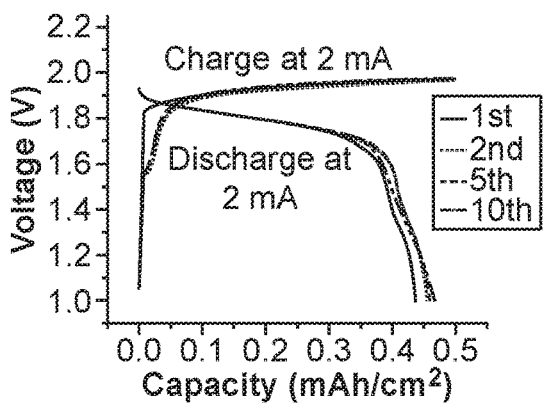
FIG. 1B
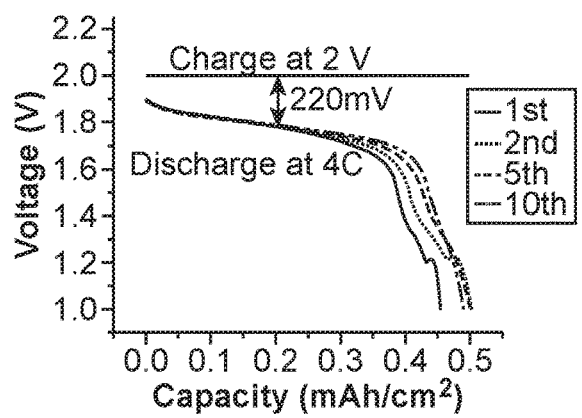
FIG. 1C
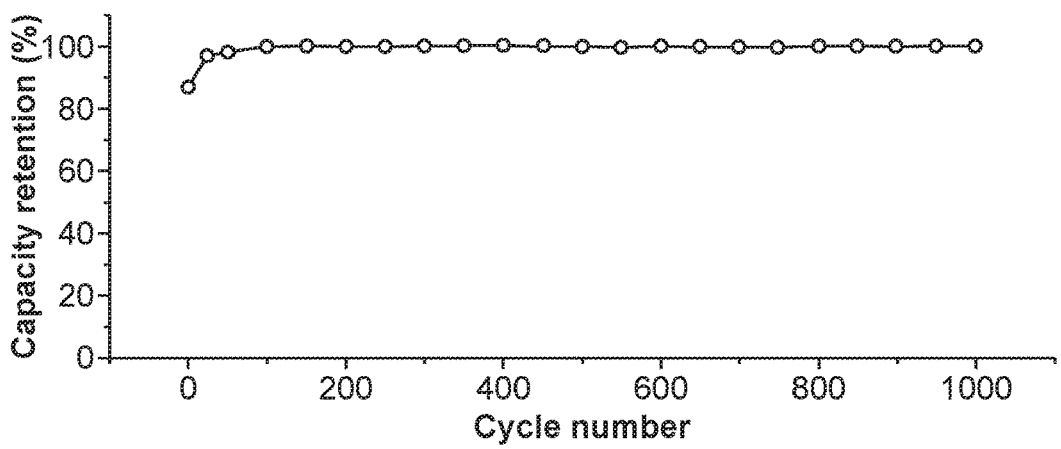
FIG. 1D

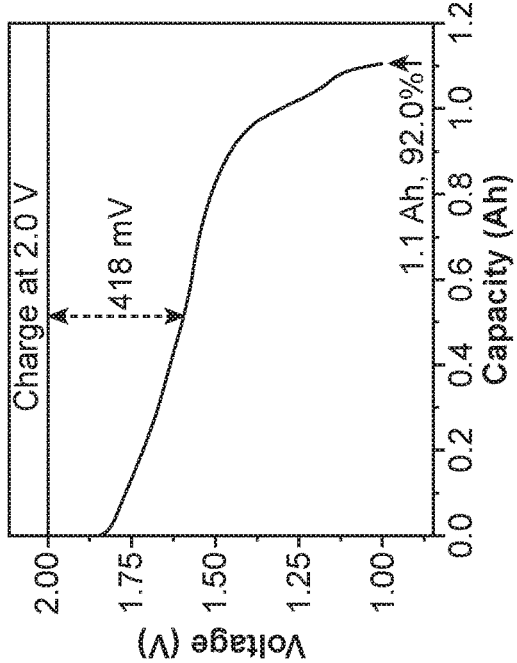
FIG. 6D
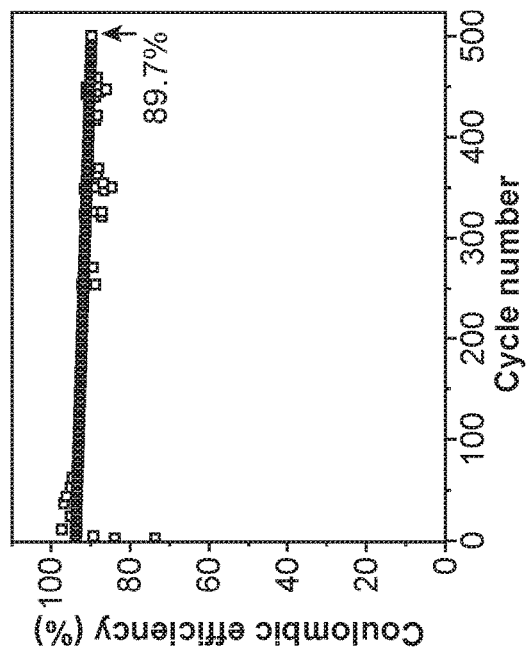
FIG. 6E
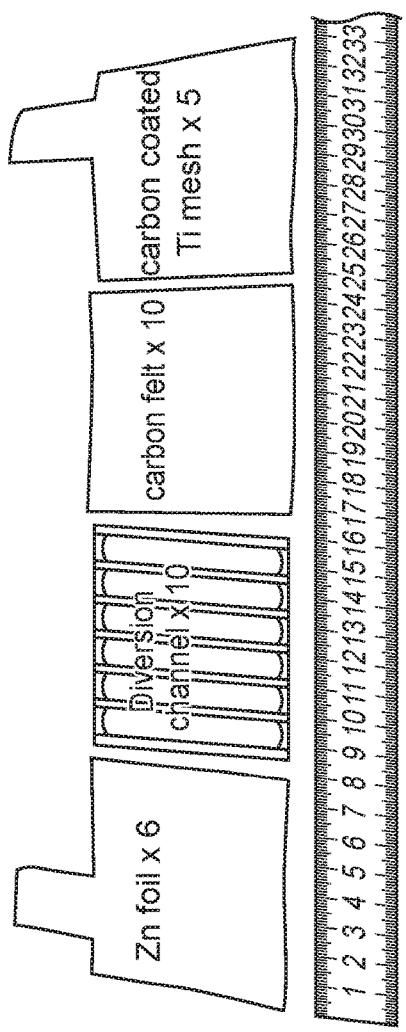
FIG. 6A
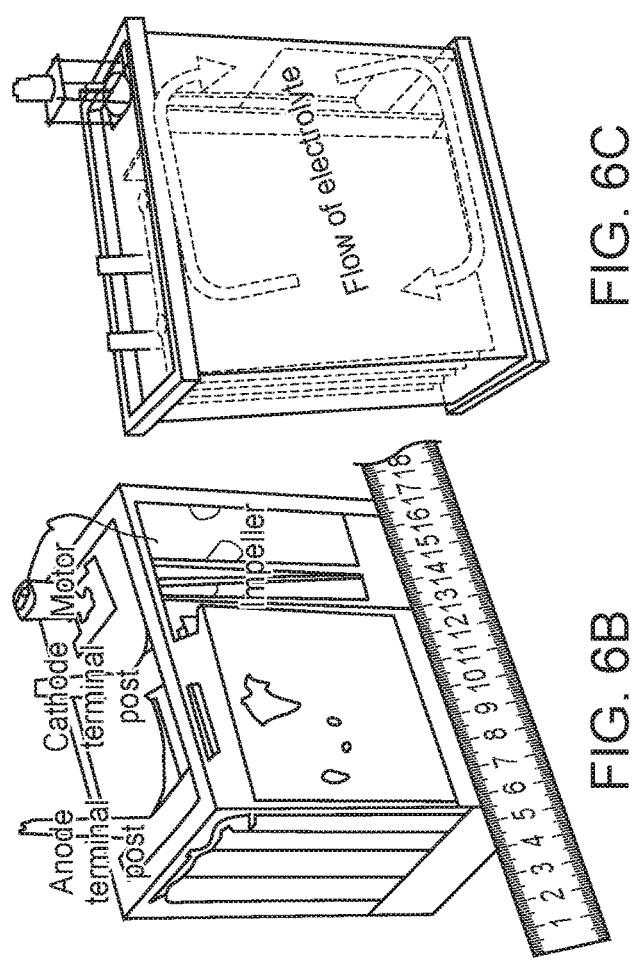
FIG. 6B
FIG. 6C

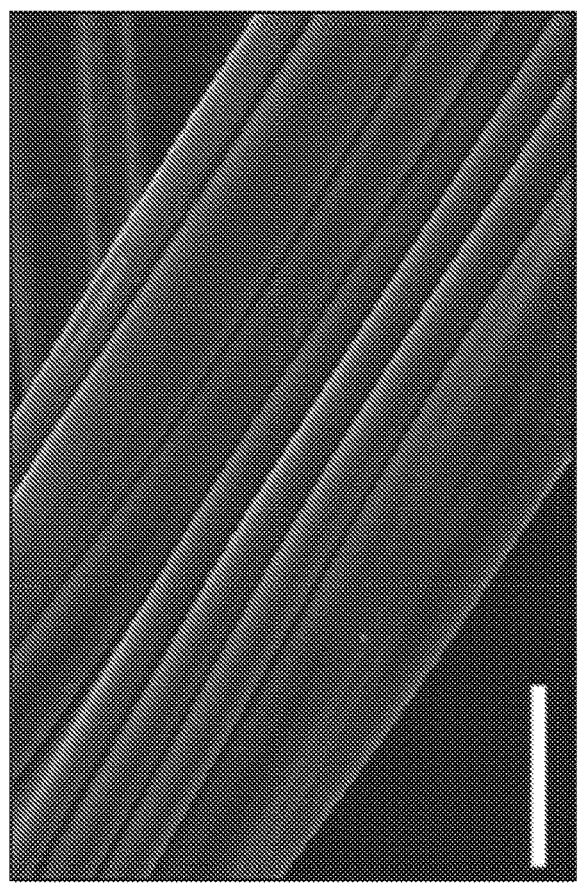
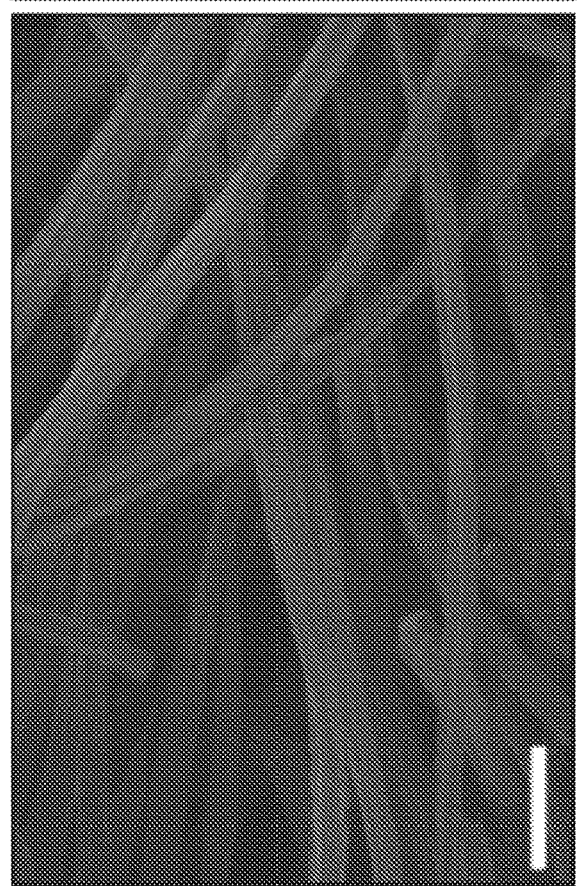
FIG. 7B
FIG. 7A

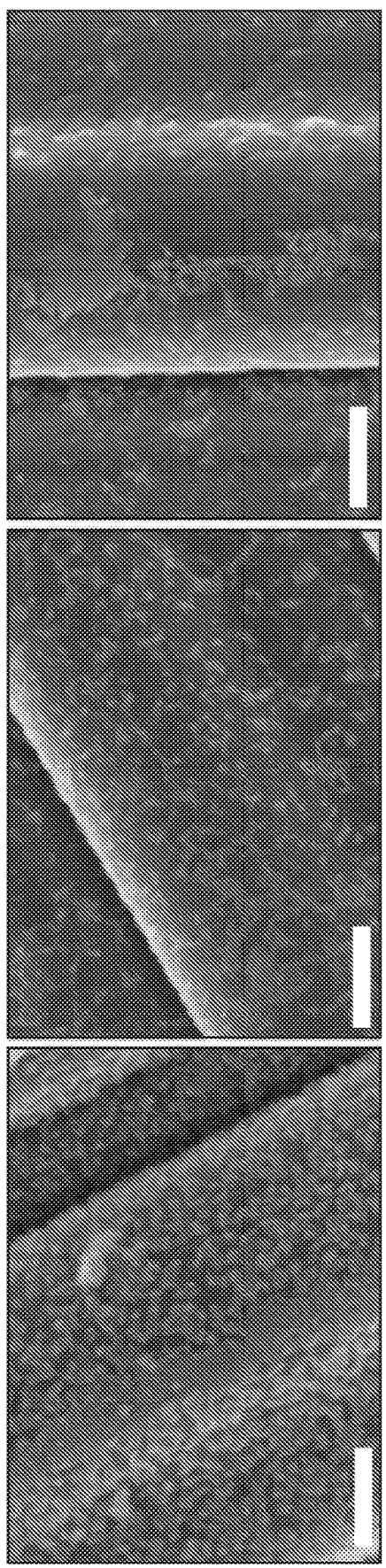

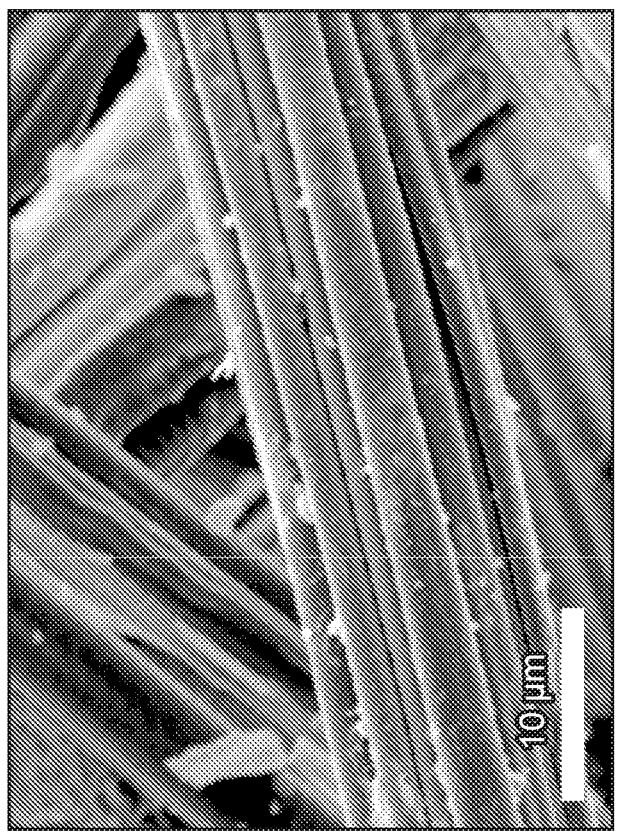
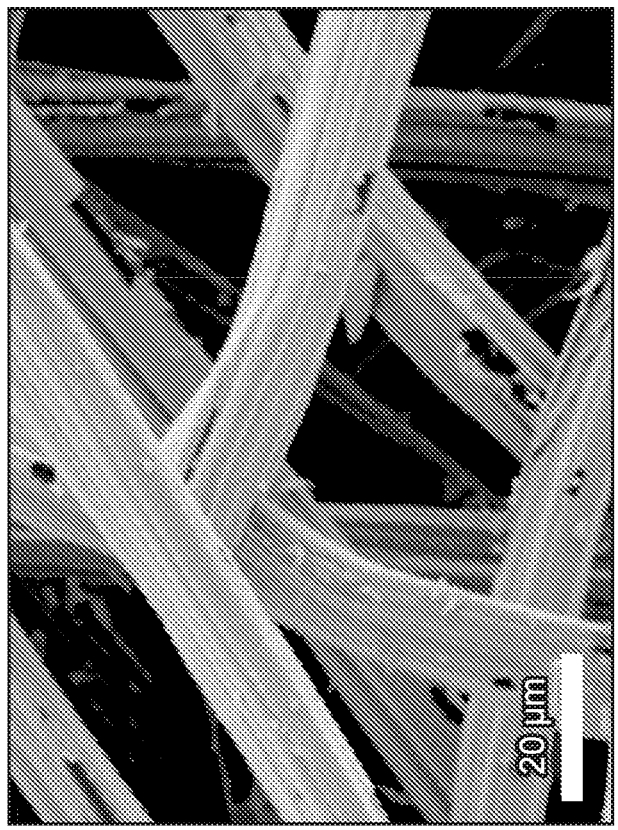
FIG. 24B
FIG. 24A

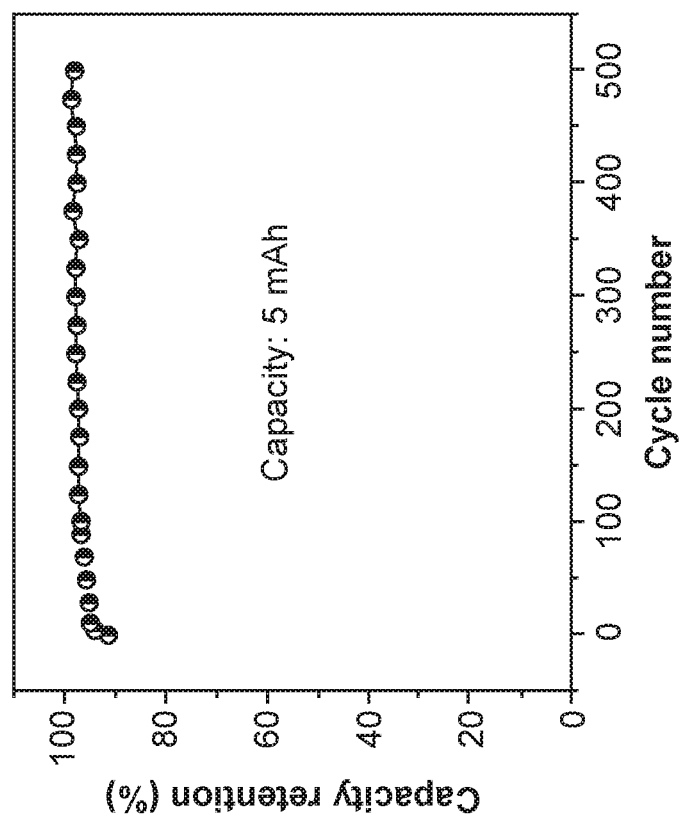
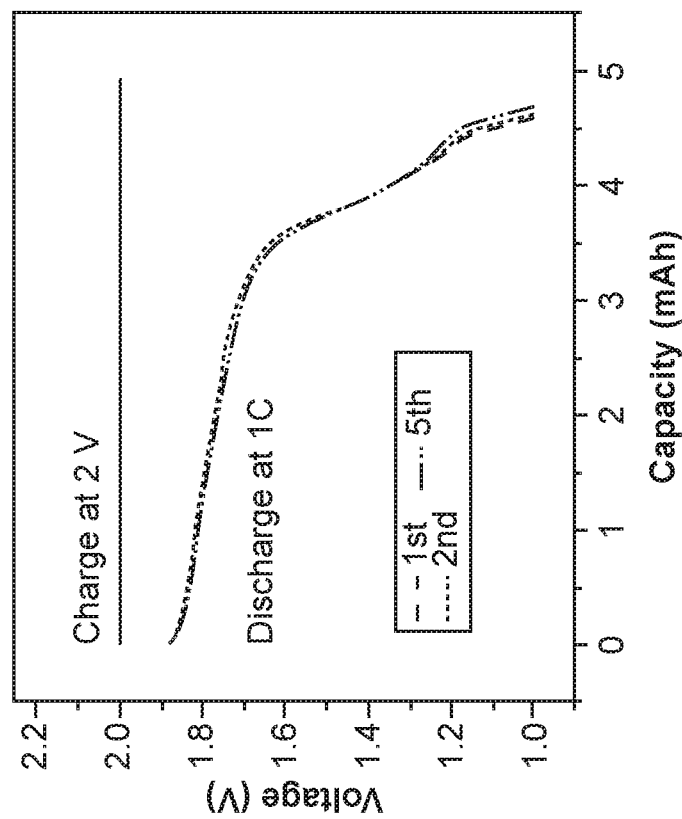
FIG. 27A
FIG. 27B

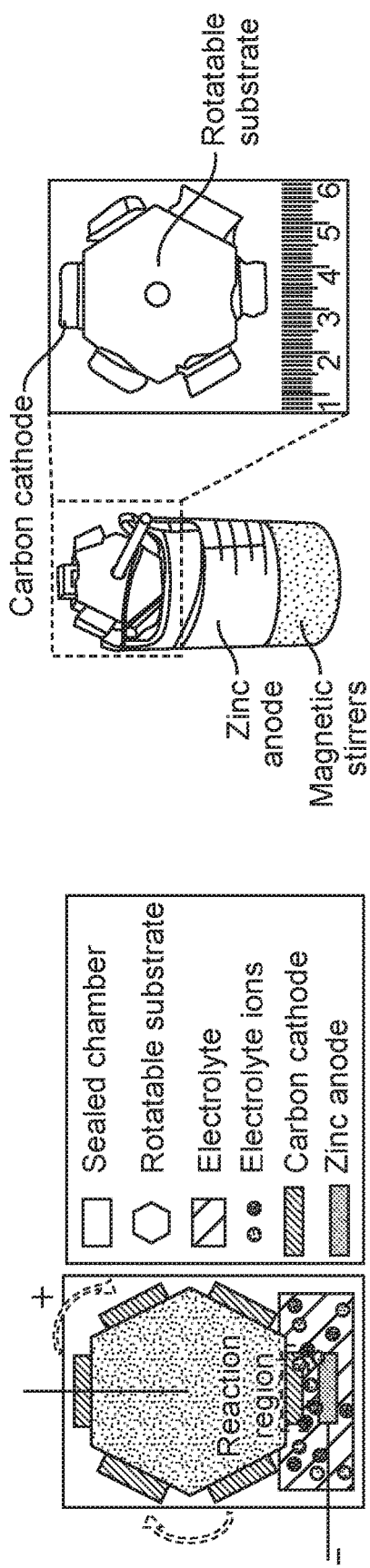
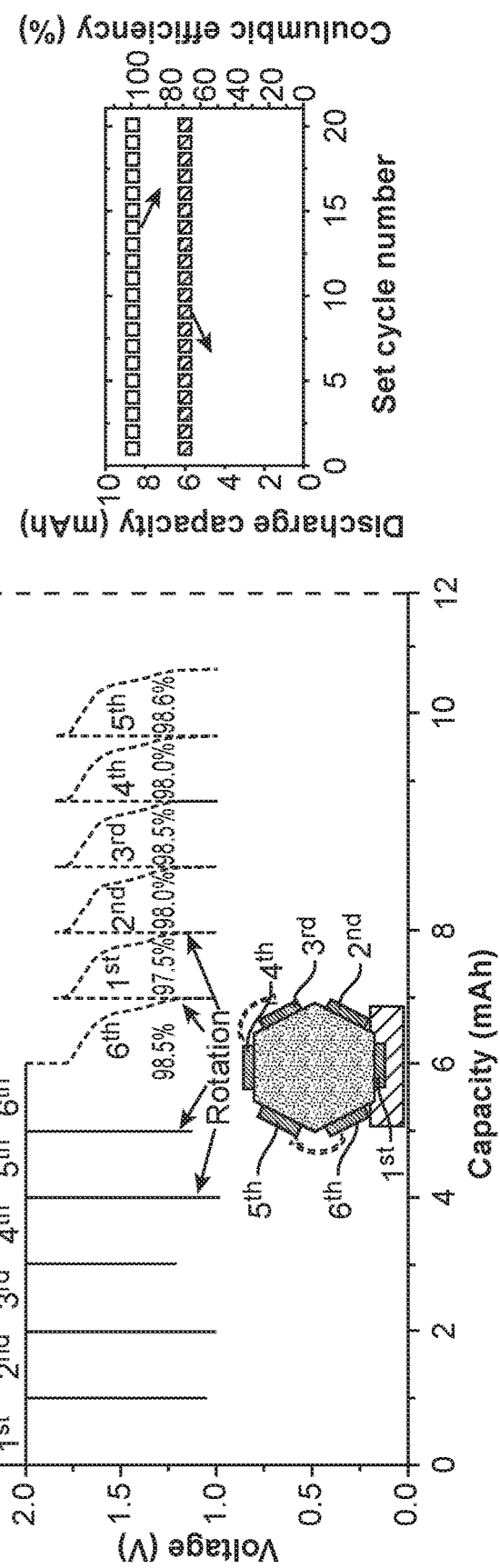
FIG. 28A
FIG. 28B
FIG. 28C

MEMBRANE-FREE Zn/MnO₂ FLOW BATTERY FOR LARGE-SCALE ENERGY STORAGE

CROSS-REFERENCE TO RELATED APPLICATIONS

This application claims the benefit of U.S. Provisional Patent Application No. 62/835,954, filed Apr. 18, 2019, which is incorporated by reference herein in its entirety.

STATEMENT REGARDING FEDERALLY SPONSORED RESEARCH OR DEVELOPMENT

This invention was made with Government support under contract DE-AC02-76-SFO0515 awarded by the Department of Energy. The Government has certain rights in the invention.

BACKGROUND

Grid-scale energy storage has attracted great attention due to the expansion of intermittent renewable energy sources, and requests for services of power quality and energy management. It urges the development of energy storage systems with low cost, good safety, high energy density and scalability. Among various energy storage systems, lithium ion batteries are attractive due to high energy densities, but the availability of some element resources and the use of flammable, toxic and expensive organic electrolytes remain as concerns. In contrast, aqueous rechargeable batteries have favorable characteristic of low cost, high ionic conductivity, high safety and environmental friendliness. The available aqueous batteries include $Zn/LiMn_2O_4$, $Zn/MnO_2$, Zn/NiOOH, lead acid (Pb acid), metal hydride (Ni-MH), nickel-iron (Ni—Fe), and nickel-cadmium (Ni—Cd); however, these batteries display issues of inadequate cycling stability and constrained energy density (thus affecting cost per stored energy over the lifetime of batteries), seriously restricting their large-scale applications.

Different from solid-state active materials as secondary battery electrodes, redox flow battery has a prominent ability to tailor the energy capacity independently from the power output. Generally, liquid electrolyte and electroactive materials are stored externally, and the role of an electrode is to provide the electrochemically active surface for redox reaction to take place, such as vanadium redox battery, zinc/bromine battery, lead acid, and alkaline quinone flow battery. These characteristics make them promising for large scale energy storage. However, there are still some issues in these systems such as low active material concentration, low energy density, high environmental toxicity, high cost of ion selective membranes and high cost of battery system. Therefore, it is highly desirable to develop an improved flow battery with low cost, good safety and scalability.

$Zn/MnO_2$ aqueous battery has attracted great interest due to its low cost, high safety, high output voltage and environmental friendliness. However, primary $Zn/MnO_2$ batteries are still dominant in market rather than the rechargeable ones, mainly owing to the poor reversibility of cathode reaction during cycling, thus leading to serious capacity decay.

It is against this background that a need arose to develop the embodiments described in this disclosure.

SUMMARY

This disclosure provides novel batteries, e.g., redox flow batteries, and methods of making and operating batteries.

Certain embodiments include redox flow battery comprising: a housing; a first electrode disposed in the housing; a second electrode disposed in the housing and facing the first electrode, the first electrode is spaced from the second electrode by a gap without an intervening ion selective membrane; and a fluid conveyance mechanism connected to the housing and configured to convey an electrolyte across the gap between the first electrode and the second electrode. In some embodiments, the first electrode is a cathode, and the second electrode is an anode. In some embodiments, the first electrode includes a porous, conductive support. In some embodiments, the porous, conductive support is a carbonaceous fibrous support. In some embodiments, the second electrode includes zinc. In some embodiments, the second electrode includes a zinc foil. In some embodiments, the fluid conveyance mechanism includes a container configured to store the electrolyte, and a pump connected between the container and the housing and configured to convey the electrolyte from the container into the housing.

Other embodiments include a method of operating a redox flow battery, comprising: providing a first electrode; providing a second electrode facing the first electrode, the first electrode is spaced from the second electrode by a gap; and conveying an aqueous electrolyte across the gap between the first electrode and the second electrode, the aqueous electrolyte includes manganese ions and zinc ions. In some embodiments, the first electrode is spaced from the second electrode by the gap without an intervening ion selective membrane. In some embodiments, the first electrode is a cathode, and the second electrode is an anode. In some embodiments, the first electrode includes a porous, conductive support. In some embodiments, the porous, conductive support is a carbonaceous fibrous support. In some embodiments, the second electrode includes zinc. In some embodiments, the second electrode includes a zinc foil. In some embodiments, the electrolyte is configured to support reversible precipitation and dissolution of manganese at the first electrode and reversible precipitation and dissolution of zinc at the second electrode. In some embodiments, a concentration of the manganese ions is in a range of about 0.1 M to about 5 M, about 0.5 M to about 4 M, about 0.5 M to about 3 M, about 0.5 M to about 2 M, or about 0.5 M to about 1 M. In some embodiments, a concentration of the zinc ions is in a range of about 0.1 M to about 5 M, about 0.5 M to about 4 M, about 0.5 M to about 3 M, about 0.5 M to about 2 M, or about 0.5 M to about 1 M. In some embodiments, the aqueous electrolyte has a pH of about 7 or below, about 6.5 or below, about 6 or below, about 5.5 or below, about 5 or below, about 4.5 or below, or about 4 or below.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF DRAWINGS

FIG. 1 shows an embodiment of a redox $Zn/MnO_2$ flow battery. FIG. 1a shows configuration of a membrane-free redox flow aqueous battery. FIG. 1b shows charge and discharge curves obtained at a constant charge current of about 2 mA and discharge current of about 2 mA (It is equal to about 4 C; a rate of nC corresponds to a full discharge in 1/n h). FIG. 1c shows charge and discharge curves obtained at a constant charge voltage of about 2.0 V vs. $Zn^{2+}/Zn$ and a discharge rate of about 4 C, and FIG. 1d shows corresponding capacity retention over 1000 cycles (data shown with an interval of 25 cycles).

FIG. 2 shows an embodiment of characterization of samples obtained from a redox flow Zn/MnO$_2$ battery embodiments. FIG. 2e shows XRD pattern and FIG. 2f, XPS spectra of cathode materials deposited on the carbon felt surface after first charge in FIG. 2a.

FIG. 3 shows charge and discharge curves of redox flow in an Zn/MnO$_2$ battery embodiment at various discharge rates and corresponding XPS characterizations of different samples. FIG. 3c, Mn 2p and FIG. 3d Zn 2p. Numbers adjacent to dashed lines represent the peaks' binding energy values.

FIG. 5 shows scale up of redox flow of an Zn/MnO$_2$ battery embodiment.

FIG. 6 shows construction of an embodiment of a bench-scale cell of about 1.2 Ah as well as its electrochemical performance. FIG. 6a show the cell is composed of 6 Zn foils as anodes, 10 carbon felts as cathodes, 5 carbon coated Ti mesh as cathode current collectors, and 10 PMMA water-diversion channels. FIG. 6b shows the digital picture and FIG. 6c shows a cross-section schematic of the cell, where the electrolyte flow propelled by the impeller is indicated by green arrow. FIG. 6d shows charge the cell at about 2.0 V to about 1.2 Ah and then discharge at about 500 mA to about 1.0 V. FIG. 6e shows capacity retention over 500 cycles when charging the cell at about 2.0 V to about 1.2 Ah and then discharge at about 1000 mA to about 1.0 V.

FIG. 7a shows the morphology of an embodiments of pure carbon felt in an SEM image with a scale bar of 50 μm. FIG. 7b shows the morphology of an embodiments of pure carbon felt in an SEM image with a scale bar of 5 μm.

FIG. 10 shows TEM characterization of deposited MnO$_2$ of an embodiments of carbon felt surface after a first charge.

FIG. 14 shows characterization of an embodiment of a Zn anode electrode.

FIG. 16 shows morphology of carbon felt of an embodiment obtained at first discharge process when the discharge rate is about 0.5 C. FIG. 16a shows discharge end voltage of about 1.4 V vs. Zn$^{2+}$/Zn. FIG. 16b shows discharge end voltage of about 1.3 V vs. Zn$^{2+}$/Zn. FIG. 16c shows discharge end voltage of about 1 V vs. Zn$^{2+}$/Zn. Scale bar stands for 2 μm.

FIG. 17 shows TEM Characterization of sample on the carbon felt of an embodiment surface at the first discharge end voltage of about 1.3 V vs. Zn$^{2+}$/Zn when the discharge rate is about 0.5 C.

FIG. 18 shows XPS spectra of the sample charged at the second cycle when the discharge rate is about 0.5 C. It can be seen that when the cell is recharged, the formed Zn$_x$Mn$_{2-x}$O$_4$ can release Zn element and generate MnO$_2$ again.

FIG. 20 shows morphology of carbon felt of an embodiment after first charge at different voltage.

FIG. 21 shows charge and discharge curves obtained at a constant charge voltage of about 2 V vs. $Zn^{2+}/Zn$ and a discharge rate of about 4 C for a particular embodiment.

FIG. 22 shows influence of $Mn^{2+}$ ion concentration on the performance of $Zn/MnO_2$ battery of an embodiment.

FIG. 23 shows influence of $Zn^{2+}$ ion concentration on the performance of $Zn/MnO_2$ battery of an embodiment.

FIG. 24 shows morphology of a carbon felt of an embodiment. FIG. 24a shows Charge the cell to about 1 mAh/cm² at first cycle and FIG. 24b shows after first discharge process.

FIG. 25 shows scale up $Zn/MnO_2$ flow battery of an embodiment.

FIG. 26 shows morphology of the carbon felt of an embodiment.

FIG. 27 shows scale up $Zn/MnO_2$ flow battery of an embodiment. FIG. 27a shows Charge and discharge curves at a capacity of about 5 mAh (carbon felt area: about 10 cm²), and FIG. 27b shows corresponding capacity retention over 500 cycles (data shown with an interval of 25 cycles).

FIG. 28 shows a demonstration of a rotational cathode $Zn/MnO_2$ flow cell. FIG. 28a shows a schematic and FIG. 28b shows a picture of the cell. FIG. 28c shows charge-discharge curves when charging at 2 V for 1 mAh per carbon felt cathode and discharging at 1 mA to 1 V. Inset shows the cycle performance of the cell.

DETAILED DESCRIPTION

Figure 2A:
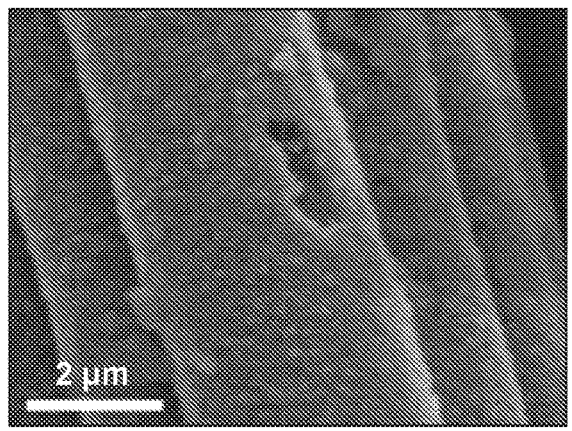
FIG. 2a shows a SEM image of carbon felt after first charge. SEM images of carbon felt obtained at first discharge voltages of FIG. 2b, about 1.6 V, FIG. 2c, about 1.3 V, FIG. 2d, about 1.0 V vs. Zn$^{2+}$/Zn in sequence (see FIG. 1c).

Disclosed herein are novel batteries, e.g., redox flow batteries, and methods of making and operating batteries.
Redox Flow Battery The present disclosure includes embodiments directed to a redox flow battery including: (1) a housing; (2) a first electrode disposed in the housing; (3) a second electrode disposed in the housing and facing the first electrode, the first electrode is spaced from the second electrode by a gap without an intervening ion selective membrane; and (4) a fluid conveyance mechanism connected to the housing and configured to convey an electrolyte across the gap between the first electrode and the second electrode.

In some embodiments of the redox flow battery, the first electrode is a cathode, and the second electrode is an anode. In some embodiments, the porous, conductive support included in the first electrode includes a carbonaceous fibrous support, such as carbon cloth, carbon paper, or carbon felt, although other carbonaceous or non-carbon-based fibrous supports can be used. In some embodiments, the cathode is constituted to allow manganese-based chemistry with the reversible $Mn^{2+}/MnO_2$ deposition/stripping reaction. In some embodiments, the cathode can be carried out by reversible transformation between soluble ion and solid via a two-electron transfer reaction.

In some embodiments of the redox flow battery, the second electrode includes zinc, or another metal or a combination of metals. In some embodiments, the second electrode includes a metallic foil or sheet, such as a zinc foil or sheet. In some embodiments, the anode is constituted to allow zinc-based chemistry with the reversible $Zn^{2+}/Zn$ deposition/stripping reaction.

In some embodiments, the fluid conveyance mechanism includes one or more of a container configured to store the electrolyte, and a pump connected between the container and the housing and configured to convey the electrolyte from the container into the housing.

In some embodiments of the redox flow battery, the electrolyte is configured to support reversible precipitation and dissolution of manganese at the first electrode and/or reversible precipitation and dissolution of zinc at the second electrode.

In some embodiments of the redox flow battery, the electrolyte is an aqueous electrolyte. In some embodiments, the aqueous electrolyte includes manganese ions and zinc ions. In some embodiments, the manganese ions include $Mn^{2+}$, although manganese ions having other oxidation states can be included. In some embodiments, a concentration of the manganese ions is in a range of about 0.1 molar (M) to about 5 M, such as about 0.5 M to about 4 M, about 0.5 M to about 3 M, about 0.5 M to about 2 M, or about 0.5 M to about 1 M. In some embodiments, the zinc ions include $Zn^{2+}$. In some embodiments, a concentration of the zinc ions is in a range of about 0.1 M to about 5 M, such as about 0.5 M to about 4 M, about 0.5 M to about 3 M, about 0.5 M to about 2 M, or about 0.5 M to about 1 M. In some embodiments, the aqueous electrolyte has a pH of about 7 or below, such as about 6.5 or below, about 6 or below, about 5.5 or below, about 5 or below, about 4.5 or below, or about 4 or below, and down to about 3 or below, down to about 2.5 or below, or down to about 2 or below.

Some embodiments of the redox flow battery include batteries, can demonstrate a high discharge voltage, e.g., of about 1.78 V, excellent cycling stability (e.g., 1000 cycles without noticeable decay) and/or good rate capability, e.g., up to about 10 C Some embodiments of the redox flow battery include a membrane-free aqueous flow $Zn/MnO_2$ battery, where the anode has the zinc-based chemistry with the reversible $Zn^{2+}/Zn$ deposition/stripping reaction, and the cathode is based on the dissolution-precipitation reaction ($Mn^{2+}/MnO_2$). Both the anode and the cathode can be based on low-cost materials. The cell is composed of $MnSO_4$ solution as the catholyte and $ZnSO_4$ solution as the anolyte, but they are mixed together without using any membrane between the two electrodes (carbon felt as the cathode collector, Zn metal foil as the current collector) (FIG. 1a). The working principle of the $Zn/MnO_2$ battery is described in the following reactions.

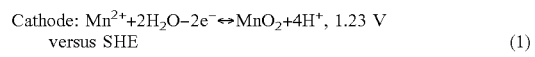

Cathode: $Mn^{2+}+2H_2O-2e^- \leftrightarrow MnO_2+4H^+$, 1.23 V versus SHE  (1)

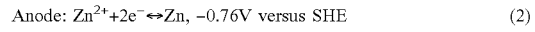

Anode: $Zn^{2+}+2e^- \leftrightarrow Zn$, −0.76V versus SHE  (2)

Overall: $Mn^{2+}+Zn^{2+}+2H_2O \leftrightarrow MnO_2+4H^++Zn$, 1.99 V (3)

At charge, highly soluble $Mn^{2+}$ ions can diffuse and electrochemically deposit on the cathode in the form of solid $MnO_2$ (equation 1, 1.23 V versus standard hydrogen electrode (SHE), theoretical capacity of 616 $mAh/g_{MnO2}$ based on the two-electron transfer reaction), while $Zn^{2+}$ ions are reduced to Zn on the anode (equation 2, −0.76 V versus SHE, 820 $mAh/g_{Zn}$). Therefore, the full cell voltage is 1.99 V, at the charge state, and both the anode and the cathode are in solid state, which are not in physical contact with each other and can allow omission of an ion selective membrane. This is a difference from comparative flow batteries where all redox molecules are in liquid phase. At discharge, the formed $MnO_2$ reversibly dissolve into soluble $Mn^{2+}$ ions and revert back into the electrolyte, and the deposited Zn dissolves into $Zn^{2+}$ ions. Impressively, the cathode can be carried out by reversible transformation between soluble $Mn^{2+}$ ion and solid $MnO_2$ via a two-electron transfer reaction, which is different from and superior to a comparative cathode that is cycled between $MnO_2$ and MnOOH via a one-electron transfer reaction. It is significant that the theoretical capacity of the cathode reaction (616 $mAh/g_{MnO2}$) is twice that of the comparative $Zn/MnO_2$ cell (308 $mAh/g_{MnO2}$). It is noted that the long cycle life (about 10,000 cycles) of $Mn^{2+}/MnO_2$ dissolution/precipitation chemistry is possible.

Herein it is demonstrated that embodied batteries, e.g., $Zn/MnO_2$ batteries, can demonstrate a high discharge voltage, e.g., of about 1.78 V, excellent cycling stability (e.g., 1000 cycles without noticeable decay) and/or good rate capability, e.g., up to about 10 C. Moreover, the theoretical energy density for an embodied battery is calculated at the substantially equal concentration of $Mn^{2+}$ and $Zn^{2+}$ ions in the electrolyte. The theoretical volumetric energy density could be modulated from about 46.4 Wh $L^{-1}$ for about 0.5 M electrolyte to about 370.9 Wh $L^{-1}$ for about 4 M saturated electrolyte (Table 1).

Methods of Operating a Redox Flow Battery

Additional embodiments are directed to a method of operating a redox flow battery including: (1) providing a first electrode; (2) providing a second electrode facing the first electrode, the first electrode is spaced from the second electrode by a gap; and (3) conveying an aqueous electrolyte across the gap between the first electrode and the second electrode, the aqueous electrolyte includes manganese ions and zinc ions.

In some embodiments of the method, the first electrode is spaced from the second electrode by the gap without an intervening ion selective membrane.

In some embodiments of the method, the first electrode is a cathode, and the second electrode is an anode.

In some embodiments of the method, the first electrode includes a porous, conductive support. In some embodiments, the porous, conductive support included in the first electrode is a carbonaceous fibrous support, such as carbon cloth, carbon paper, or carbon felt, although other carbonaceous or non-carbon-based fibrous supports can be used.

In some embodiments of the method, the second electrode includes zinc, or another metal or a combination of metals. In some embodiments, the second electrode includes a metallic foil or sheet, such as a zinc foil or sheet.

In some embodiments of the method, the electrolyte is configured to support reversible precipitation and dissolution of manganese at the first electrode and reversible precipitation and dissolution of zinc at the second electrode.

In some embodiments of the method, the manganese ions include $Mn^{2+}$, although manganese ions having other oxidation states can be included. In some embodiments, a concentration of the manganese ions is in a range of about 0.1 molar (M) to about 5 M, such as about 0.5 M to about 4 M, about 0.5 M to about 3 M, about 0.5 M to about 2 M, or about 0.5 M to about 1 M. In some embodiments, the zinc ions include $Zn^{2+}$. In some embodiments, a concentration of the zinc ions is in a range of about 0.1 M to about 5 M, such as about 0.5 M to about 4 M, about 0.5 M to about 3 M, about 0.5 M to about 2 M, or about 0.5 M to about 1 M. In some embodiments, the aqueous electrolyte has a pH of about 7 or below, such as about 6.5 or below, about 6 or below, about 5.5 or below, about 5 or below, about 4.5 or below, or about 4 or below, and down to about 3 or below, down to about 2.5 or below, or down to about 2 or below.

Other aspects and embodiments of this disclosure are also contemplated. The foregoing description and the following examples are not meant to restrict this disclosure to any particular embodiment but are merely meant to describe some embodiments of this disclosure.

EXAMPLES

Configuration of Aqueous Rechargeable $Zn/MnO_2$ Flow Battery

In some embodiments, a redox flow $Zn/MnO_2$ battery is constructed by an aqueous electrolyte containing about 1 M $MnSO_4$ and about 1 M $ZnSO_4$ (pH value of about 3.8), a blank carbon felt (about 6.35 mm in thickness, FIG. 7) as a current collector at cathode side, a Zn foil anode (about 0.1 mm in thickness). A notable feature here is that no ion selective membrane is included between the two electrodes (FIG. 1a). The electrodes are both rectangles (about 1×about 2 $cm^2$) and half-immersed into the electrolyte in a Pyrex glass vial, and an inter-electrode gap is about 4 mm. The conductive electrode area in contact with electrolyte is about 1 $cm^2$ and the upper half of electrodes are connected to titanic wires.

Figure 8:
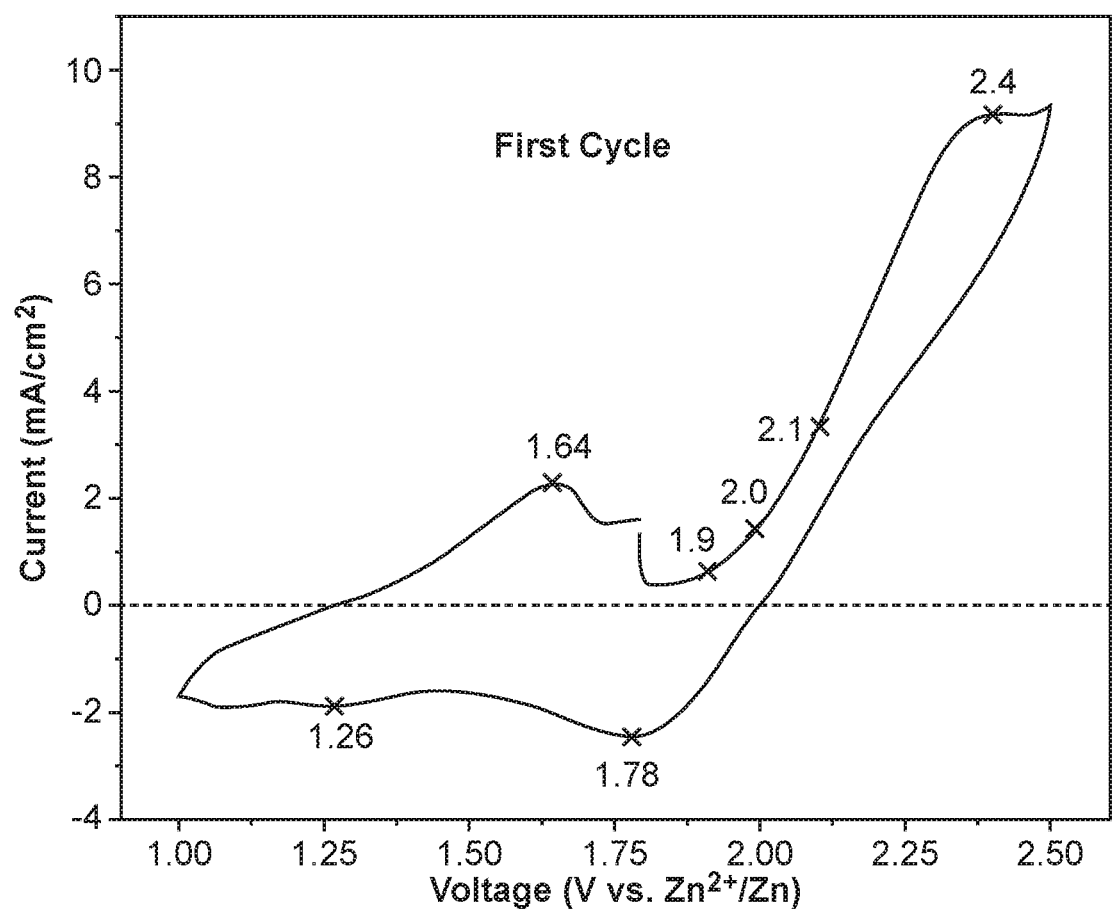
FIG. 8 shows a cyclic voltammogram (CV) of zinc anode and cathode at about 2 mV/s in aqueous electrolyte containing about 1 M MnSO$_4$ and about 1 M ZnSO$_4$ (pH of about 3.8). The tests were carried out in a two electrode setup by taking glassy carbon as cathode and Zn foil as anode electrode.
Figure 9:
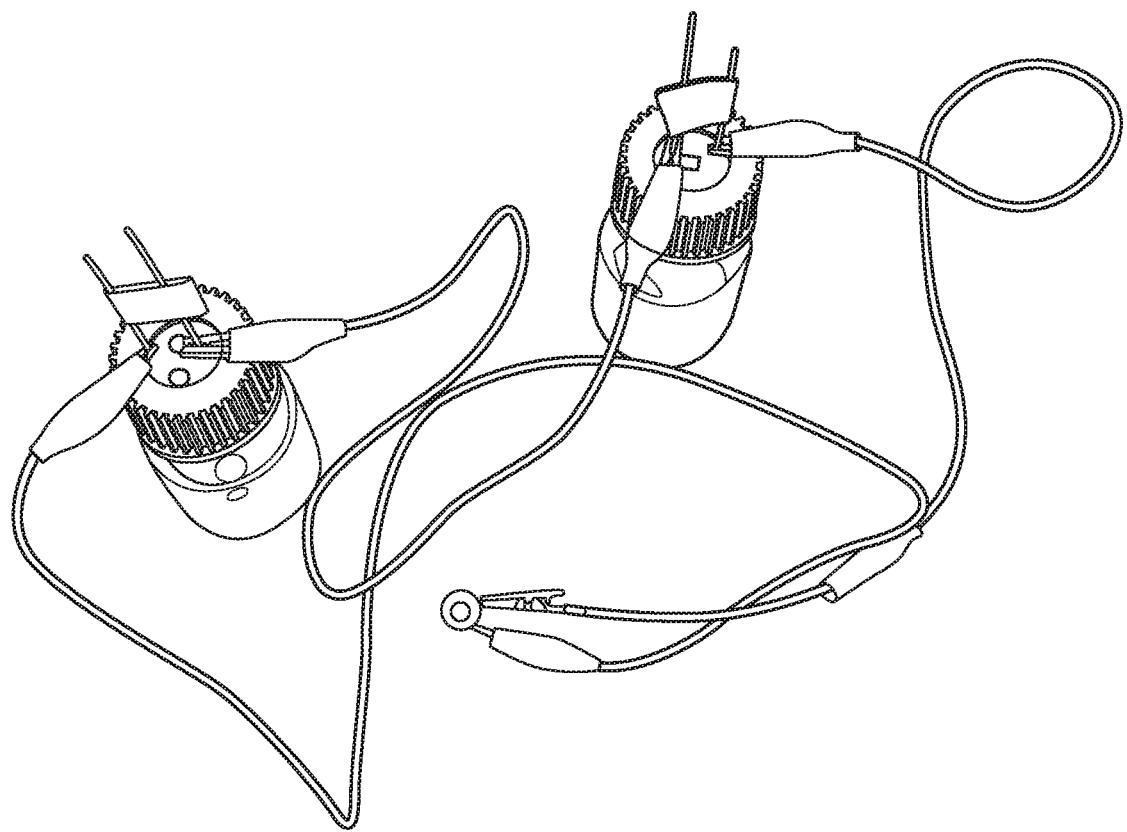
FIG. 9 shows the operation of a light-emitting diode (LED) by using an embodiment of a Zn/MnO$_2$ flow battery.

To realize the possible electrochemical behaviors, cyclic voltammogram (CV) test is carried out in the two-electrode full cell. Redox peaks are observed, indicating the occurrence of electrochemical deposition and dissolution of $MnO_2$ (FIG. 8). Moreover, the electrochemical deposition of $MnO_2$ occurs at about 1.9 V vs. $Zn^{2+}/Zn$ and the deposition peak is at about 2.4 V vs. $Zn^{2+}/Zn$, while the reduction peak for dissolution of $MnO_2$ is at about 1.78 V vs. $Zn^{2+}/Zn$. Next, two different charge modes including constant current and contact voltage methods are applied for this cell. FIG. 1b shows the charge and discharge curves when constant current of about 2.0 mA is used for charge and discharge. The charge voltage is up to about 2.0 V at a specific capacity of about 0.5 $mAh/cm^2$, and the corresponding average discharge plateau is about 1.78 V. Furthermore, the maximum Coulombic efficiency is up to about 92% during the first ten cycles (Coulombic efficiency (%)=discharge capacity/charge capacity×100%, which is equal to capacity retention due to the same charge capacity for every cycle). FIG. 1c shows the charge and discharge curves when constant voltage of about 2.0 V vs. $Zn^{2+}/Zn$ is used for charge and constant current of about 2 mA for discharge (corresponding to a discharge rate of about 4 C; a rate of nC corresponds to a full discharge in 1/n h). This cell also exhibits a well-defined discharge potential plateau of about 1.78 V vs. $Zn^{2+}/Zn$ (FIG. 9). The initial Coulombic efficiency is about 90%, while the subsequent values can reach up to about 100%, which is slightly higher than that obtained via constant current method. It is also noticed that the average discharge plateau is higher than the output voltage of about 1.5 V vs. $Zn^{2+}/Zn$ in the comparative primary $Zn/MnO_2$ cell, due to a higher reduction potential for cathode reaction (about 1.23 vs. about 0.95 V (SHE)).

Figure 10B:
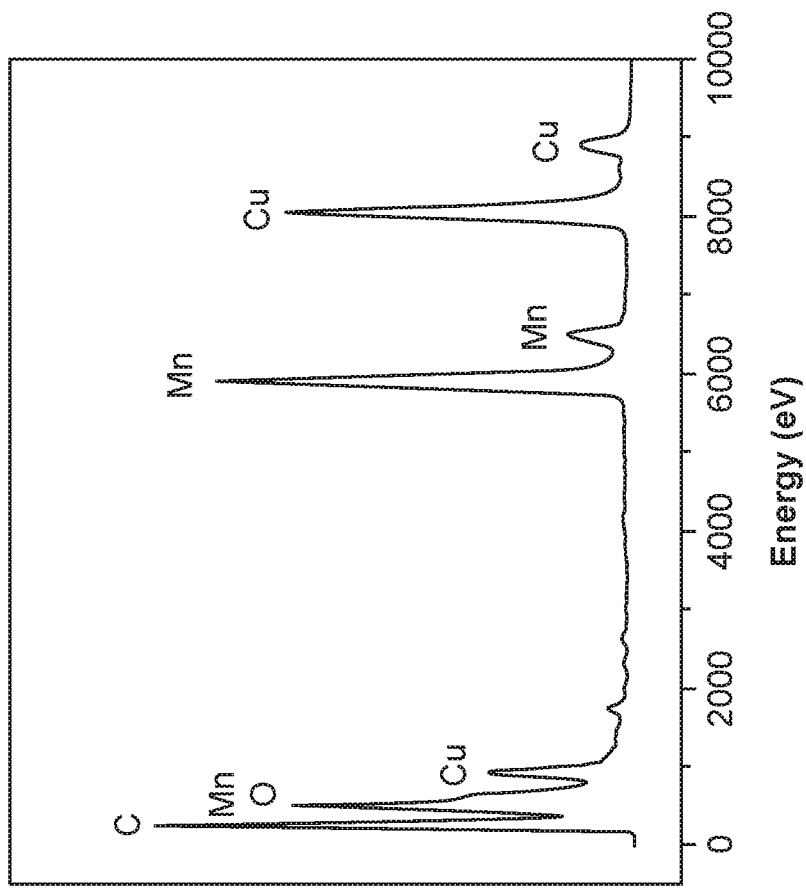
FIG. 10b shows the corresponding energy dispersive X-ray spectroscopy (EDX) measurement.
Figure 10A:
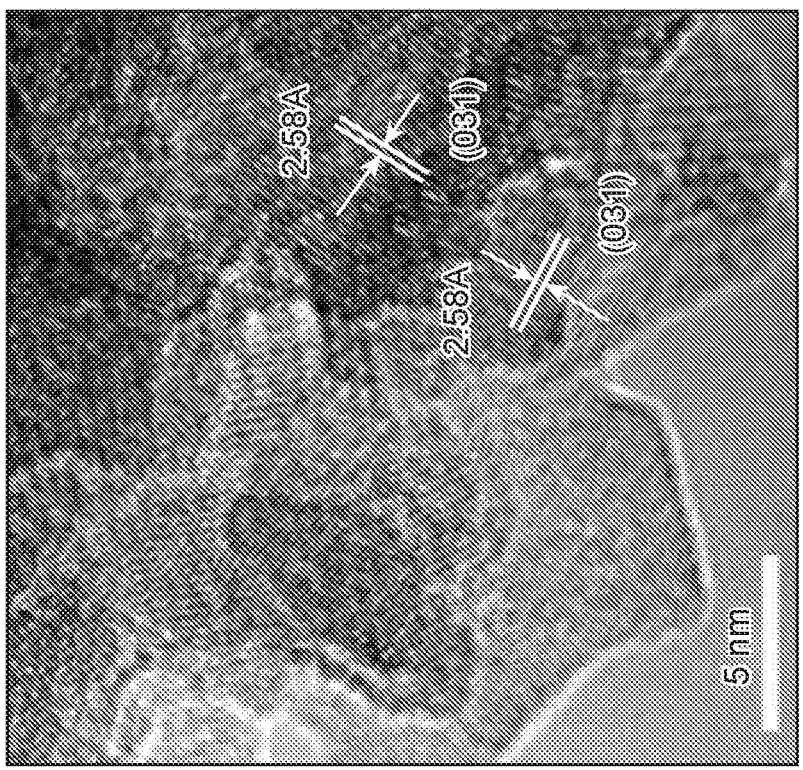
FIG. 10a shows HR-TEM image of the sample.

The electrochemical energy storage mechanism of this system is further investigated when constant voltage of about 2.0 V vs. $Zn^{2+}/Zn$ is used for charge. After first charge, there is a uniform thin layer of $MnO_2$ coated on carbon felt surface (FIG. 2a). Powder X-ray diffraction (XRD) pattern demonstrates that the deposited samples are gamma-phase $MnO_2$ (JCPDS No. 14-0644) (FIG. 2e), and they exhibit high crystallinity with interplanar spacing of about 0.26 nm, representing the (031) plane of http://en.wikipedia.org/wiki/Periodic_table_%28crystal_structure%29-Face_centered_cubic_.28cubic_close_packed.29γ-$MnO_2$ (FIG. 10).

Figure 2B:
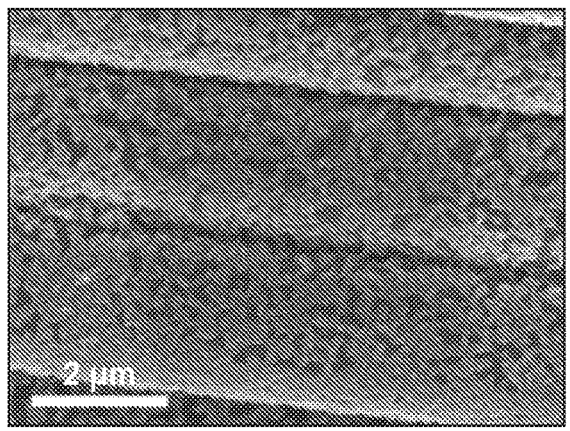
Figure 2C:
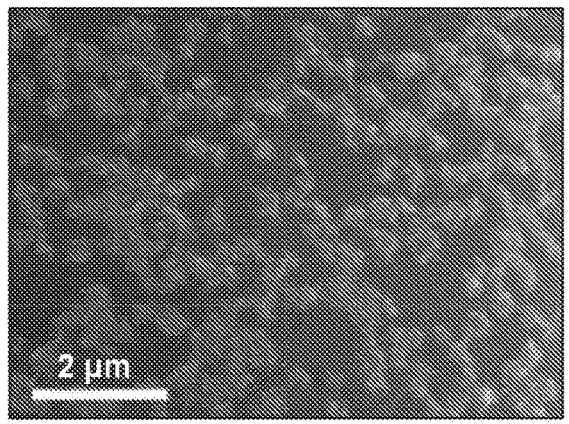
Figure 2D:
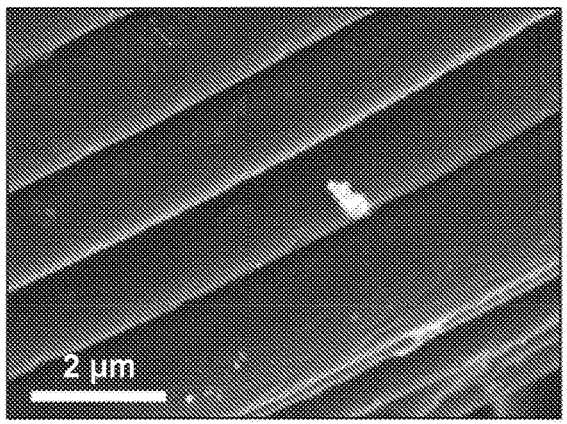
Figure 2E:
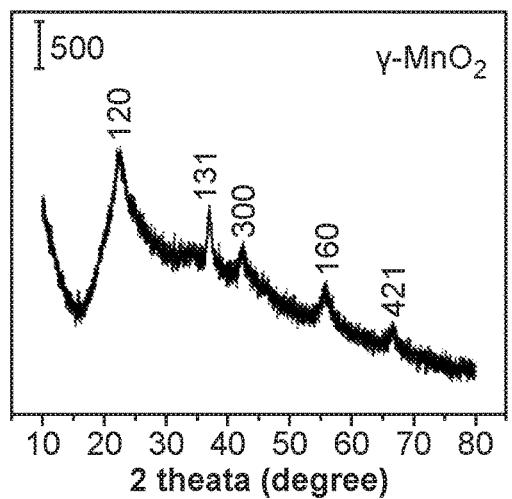
Figure 2F:
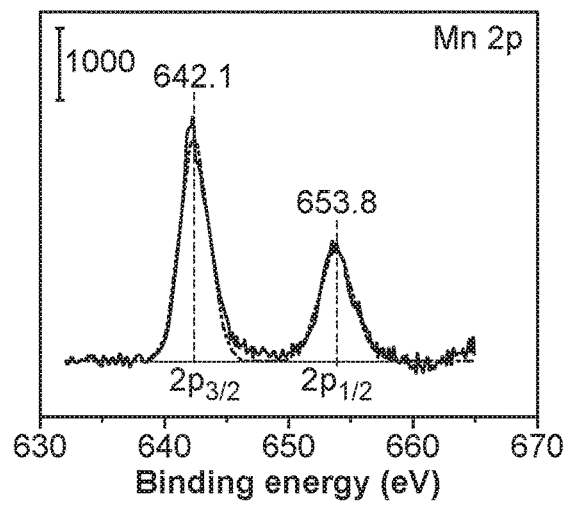
Figure 11:
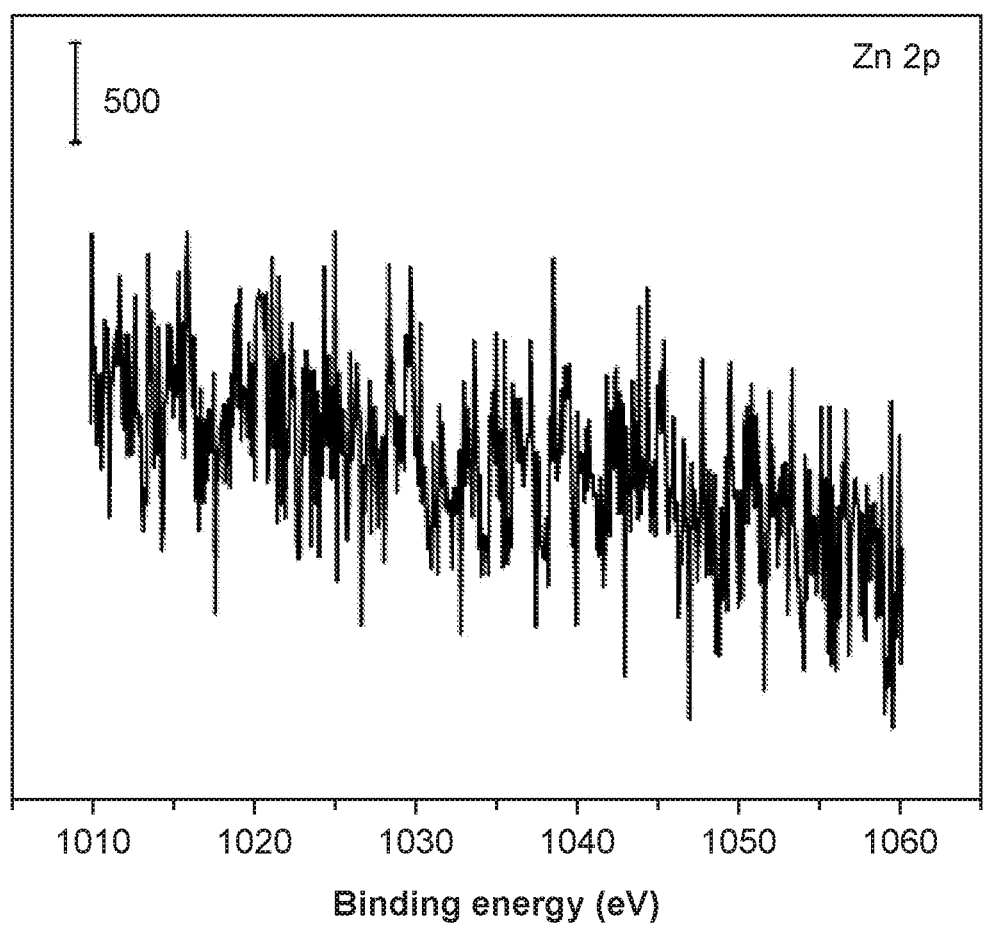
FIG. 11 shows XPS spectra of the deposited samples from FIG. 10 after first charge. It can be seen that there is no Zn element in the deposited sample after first charge

X-ray photoelectron spectroscopy (XPS) measurements further manifest that tetravalent Mn is solely present in the sample and no noticeable Zn element is found (FIG. 2f and FIG. 11). At discharge, the deposited $MnO_2$ can dissolve gradually (FIGS. 2b and c). When the discharge voltage reaches about 1 V vs. $Zn^{2+}/Zn$, most of the deposit dissolves into soluble $Mn^{2+}$ ions, but very little solid remains in patches on carbon felt surface (FIG. 2d), thus leading to the low initial Coulombic efficiency (about 90%, FIG. 1d).

Figure 12:
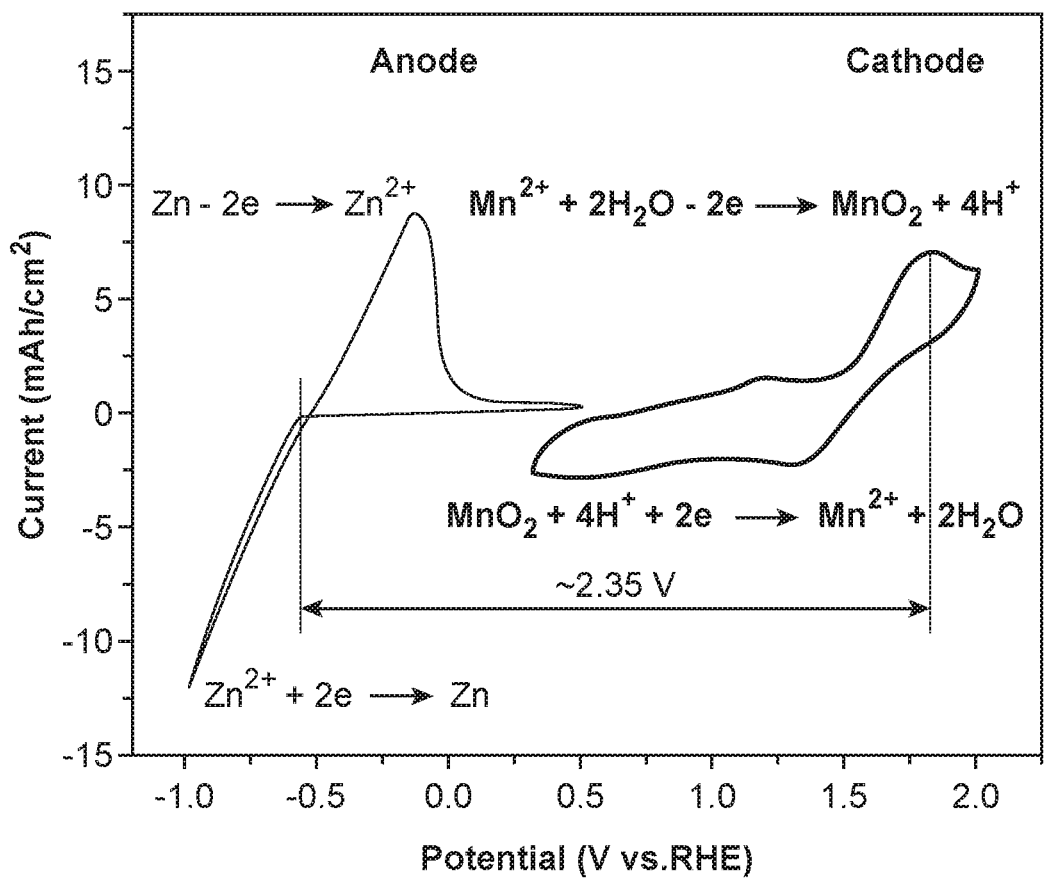
FIG. 12 shows cyclic voltammograms (CV) of zinc anode and cathode via three electrode test at about 2 mV/s in aqueous electrolyte containing about 1 M MnSO$_4$ and about 1 M ZnSO$_4$ (pH of about 3.8). The tests were carried out in a three electrode setup by taking glassy carbon as working electrode, Pt foil as counter electrode and saturated calomel reference (SCE) as reference electrode. The SCE reference electrode was calibrated with respect to reversible hydrogen electrode (RHE) in H$_2$ saturated about 1 M KOH electrolyte, yielding a relation of E(RHE)=E(SCE)+1.06 V.

It is further noted that the actual amount of deposited $MnO_2$ on the carbon felt surface is about 0.79 mg at a capacity of about 0.5 mAh at first charge (corresponding to about 630 mAh/g), very close to the theoretical value (about 0.81 mg) according to Faraday's laws of electrolysis. This result also indicates that although standard reduction potentials of $MnO_2$ and $O_2$ versus SHE are similar (about 1.23V), no noticeable $O_2$ evolution occurs during this process, possibly owing to the high overpotential for oxygen evolution reaction. This hypothesis is also confirmed by three-electrode cyclic voltammetric experiments and corresponding working potential window is about 2.35 V for redox reactions of $Mn^{2+}$ and $Zn^{2+}$ ions during charge and discharge processes (FIGS. 8 and 12).

Figure 13B:
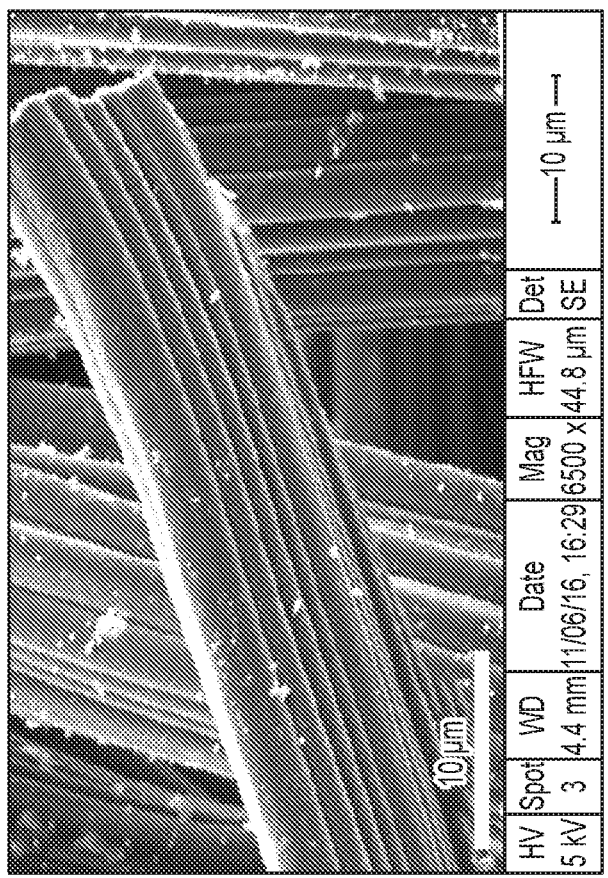
FIG. 13b shows an enlarged image of the morphology of a carbon felt after 1000 cycles.
Figure 13A:
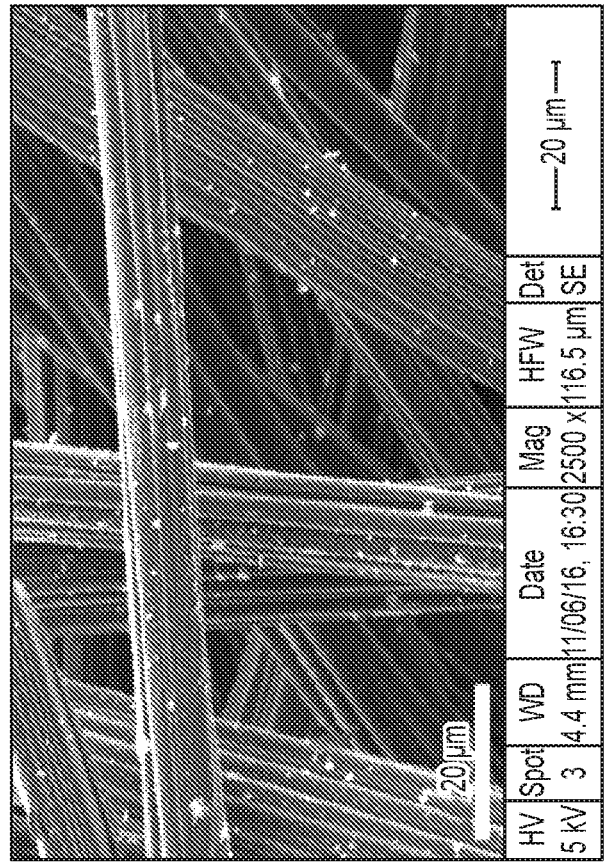
FIG. 13a shows the morphology of a carbon felt after 1000 cycles.
Figure 14A:
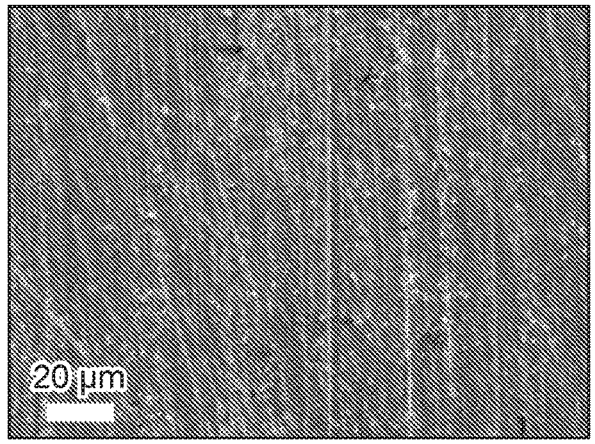
FIG. 14a shows fresh Zn foil.
Figure 14B:
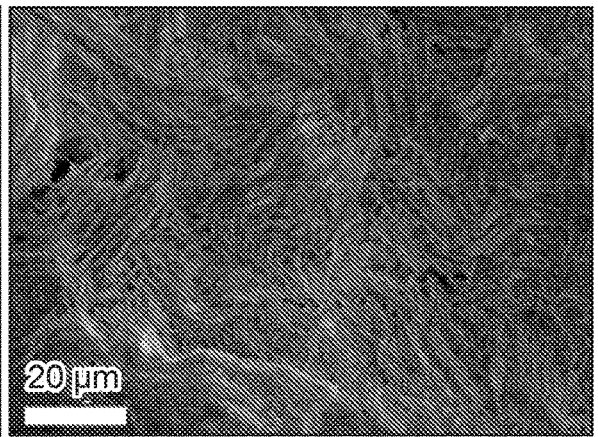
FIG. 14b shows Zn after 1000 cycles.
Figure 14C:
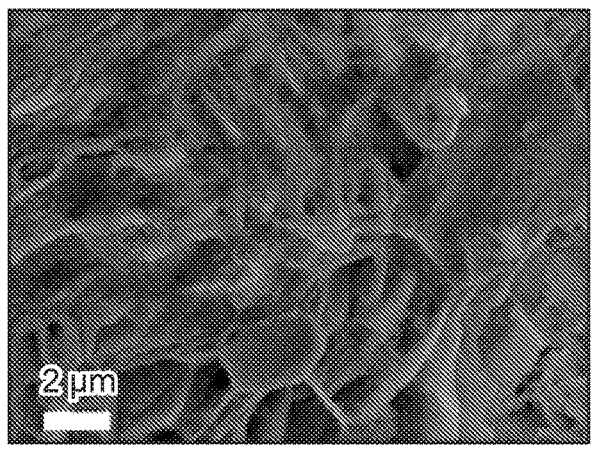
FIG. 14c is an enlarged image of the Zn after 1000 cycles.
Figure 14D:
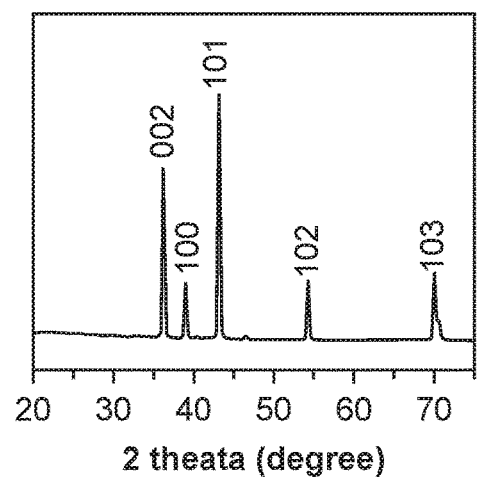
FIG. 14d is the corresponding XRD pattern of the Zn in FIGS. 14b and 14c.
Figure 15A:
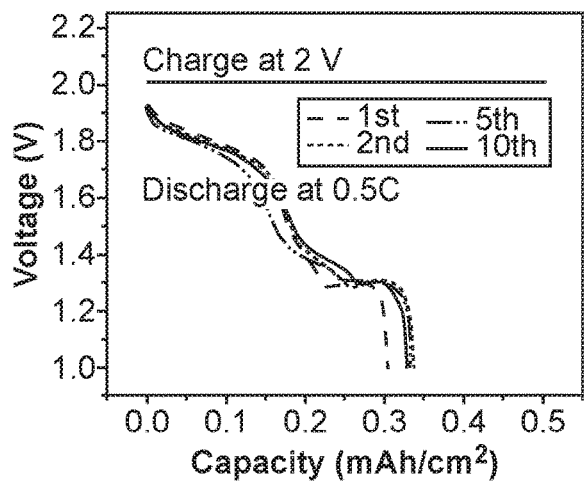
FIG. 15 shows charge and discharge curves of Zn/MnO$_2$ battery at different discharge rates. The discharge rate of FIG. 15a is about 0.5 C, the discharge rate of FIG. 15b is about 1 C, the discharge rate of FIG. 15c is about 2 C, the discharge rate of FIG. 15d is about 3 C, the discharge rate of FIG. 15e is about 4 C, the discharge rate of FIG. 15f is about 6 C, the discharge rate of FIG. 15g is about 8 C and the discharge rate of FIG. 15h is about 10 C.
Figure 15B:
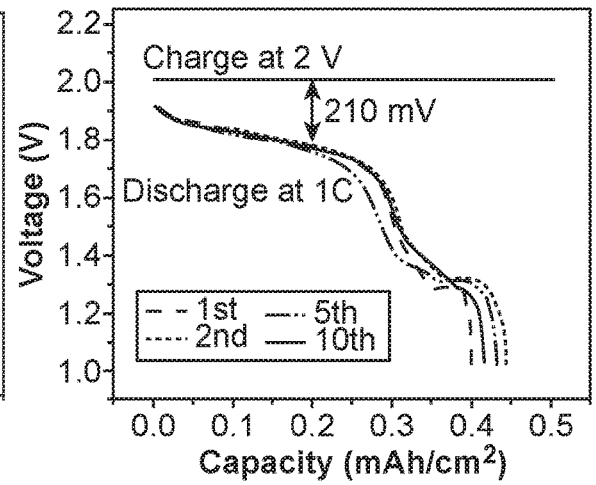
Figure 15C:
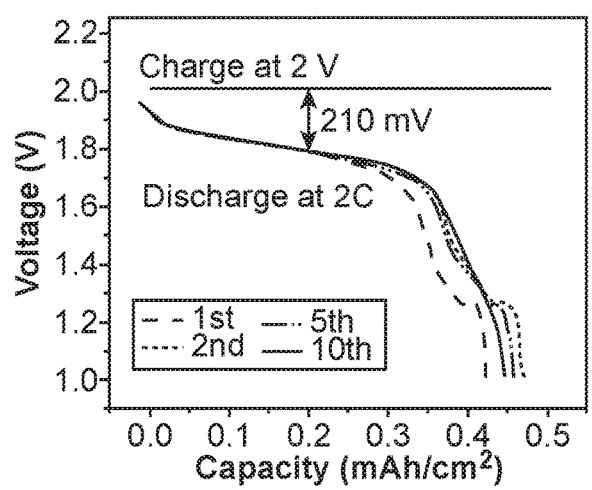
Figure 15D:
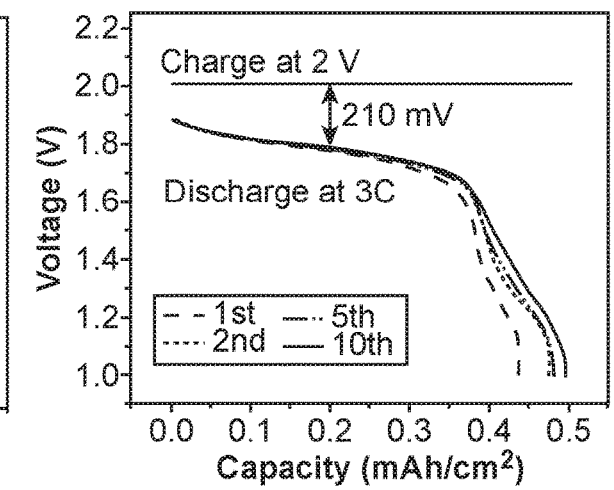
Figure 15E:
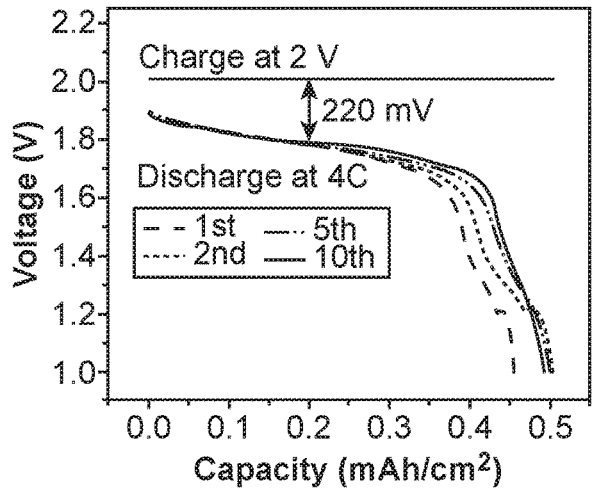
Figure 15F:
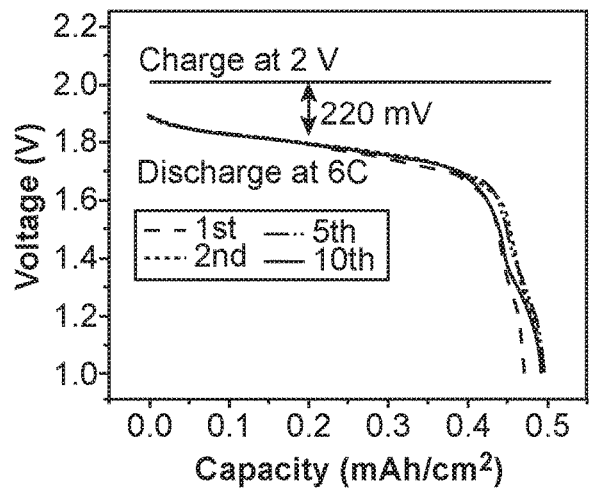
Figure 15G:
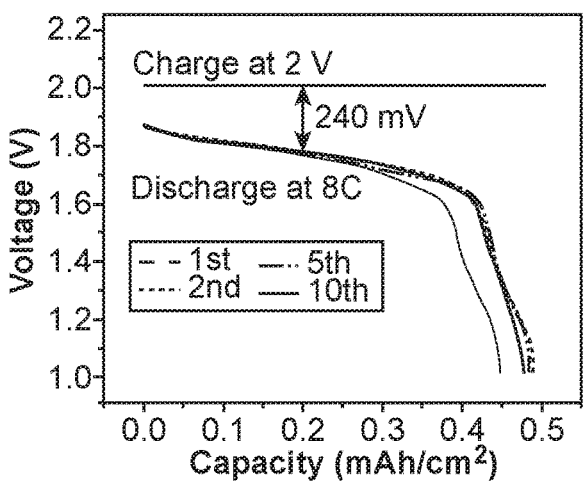
Figure 15H:
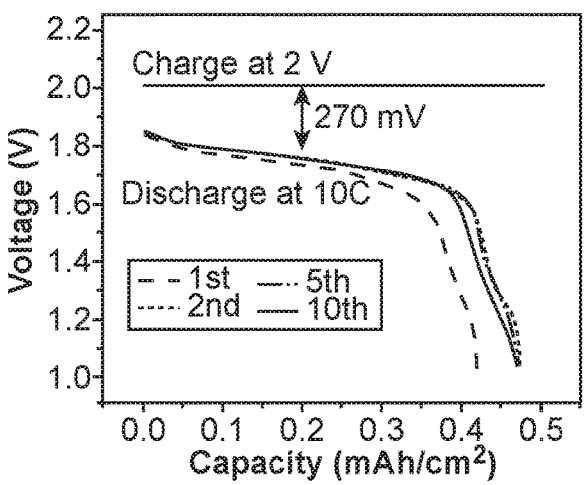

More importantly, this aqueous $Zn/MnO_2$ flow battery exhibits excellent cycling stability with a high-capacity retention of about 100% over 1000 cycles at a discharge rate of about 4 C (FIG. 1d). Furthermore, no noticeable change is observed for the carbon felt after long-term test and just a small amount of deposition is left on its surface (FIG. 13). As for Zn foil anode, its original flat surface is dramatically changed and some nanoflakes are formed rather than Zn dendrites (FIG. 14). Moreover, just Zn is present and no side products are observed, indicating that the reversible conversion between Zn and $Zn^{2+}$ ion occurs during cycling. Altogether, this redox flow battery can exhibit excellent stability of the cathode in respect with a comparative primary battery and also have great potential to achieve large-scale energy storage.

Rate Capability of Redox Flow $Zn/MnO_2$ Battery

Figure 3A:
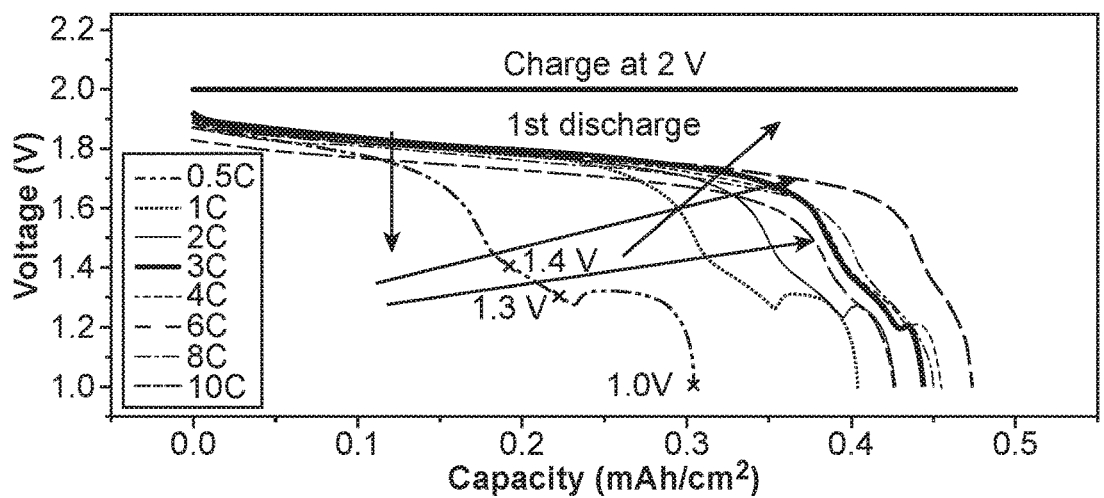
FIG. 3a shows a first charge and discharge curves at various discharge rates when the charge voltage is about 2.0 V vs. Zn$^{2+}$/Zn.
Figure 3B:
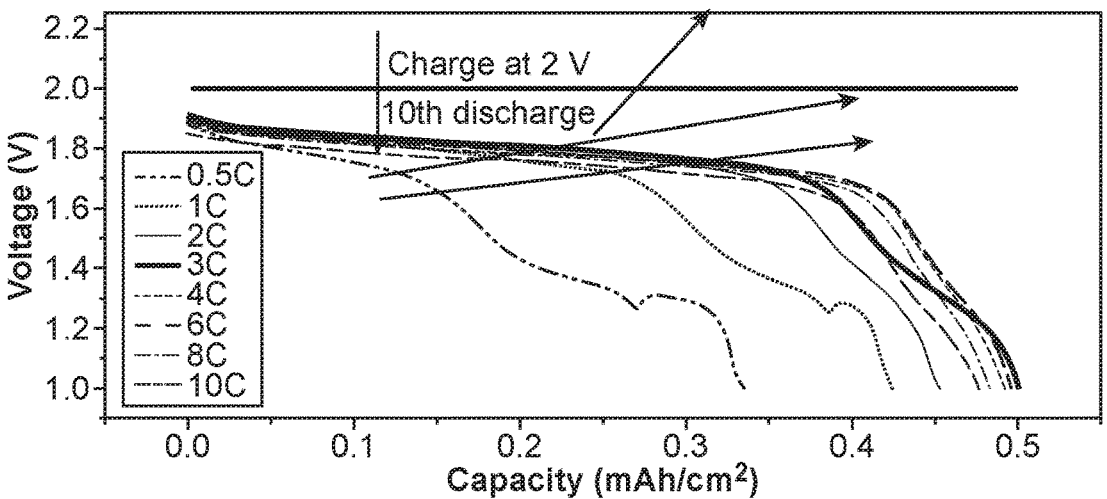
FIG. 3b shows a tenth charge and discharge curves at different discharge rates when the charge voltage is about 2.0 V vs. Zn$^{2+}$/Zn.

FIGS. 3a and b show the rate capability of the redox flow aqueous $Zn/MnO_2$ battery when constant voltage of about 2.0 V vs. $Zn^{2+}/Zn$ is used for charge (FIG. 15). At the discharge rates of about 0.5 C, about 1 C and about 2 C, all the curves exhibit similar characteristics and two continuous discharge plateaus are observed. One plateau is with the average discharge voltage of about 1.78 V vs. $Zn^{2+}/Zn$, and the other one is dependent on the discharge rate, such as about 1.3 V at about 0.5 C, about 1.25 V at about 1 C and about 1.2 V at about 2 C. The initial Coulombic efficiencies are about 60%, about 80% and about 85%, respectively, and corresponding tenth values are about 68%, about 85% and about 91%. With increasing the discharge rate to about 3 C and about 4 C, the discharge plateau at higher voltage becomes longer and the other one at lower voltage becomes shorter. Furthermore, when the discharge rates are about 6 C, about 8 C and about 10 C, just the discharge plateau at higher voltage is observed, indicating that just dissolution of $MnO_2$ into soluble $Mn^{2+}$ ion occurs at discharge (equation 1).

Figures 3C, 3D:
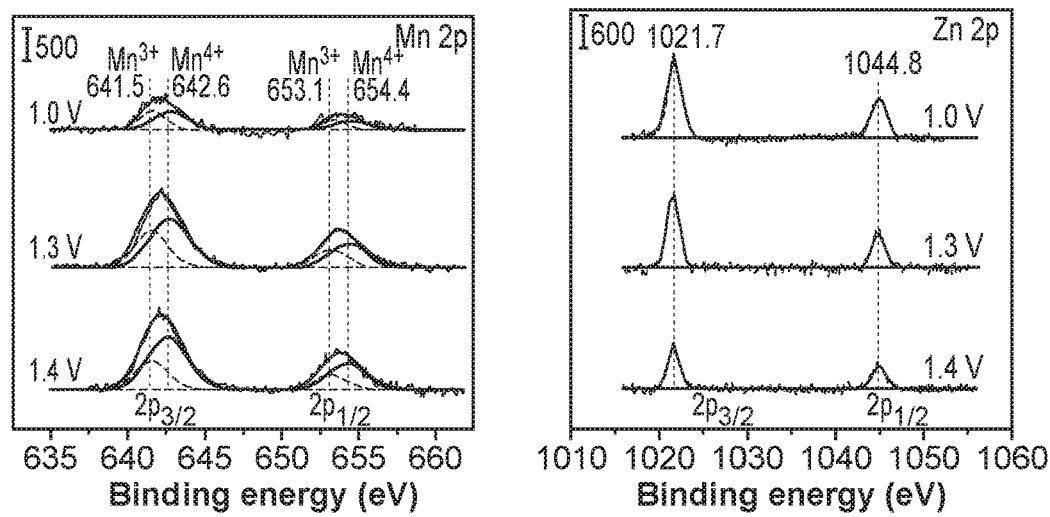
FIG. 3c and FIG. 3d show XPS spectra of samples obtained at first different discharge end voltages of about 1.4 V, about 1.3 V and about 1.0 V vs. Zn$^{2+}$/Zn (marked in FIG. 3a) when the discharge rate is about 0.5 C.
Figure 17B:
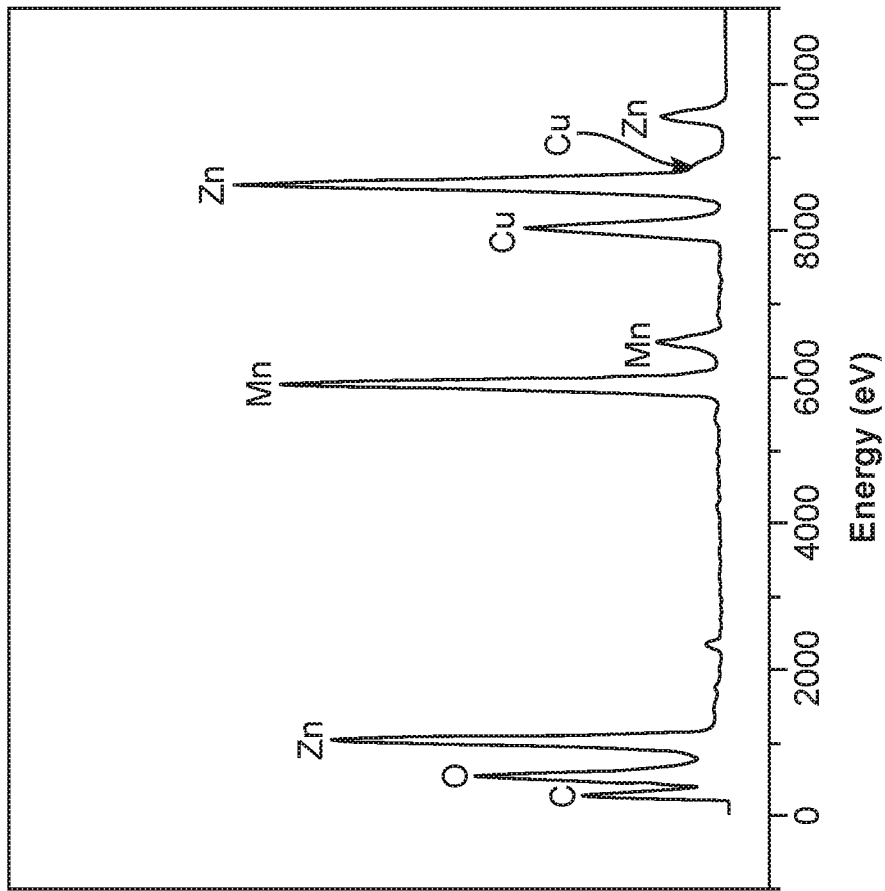
FIG. 17a shows HR-TEM image of the sample and FIG. 17b shows a corresponding EDX spectrum.
Figure 17A:
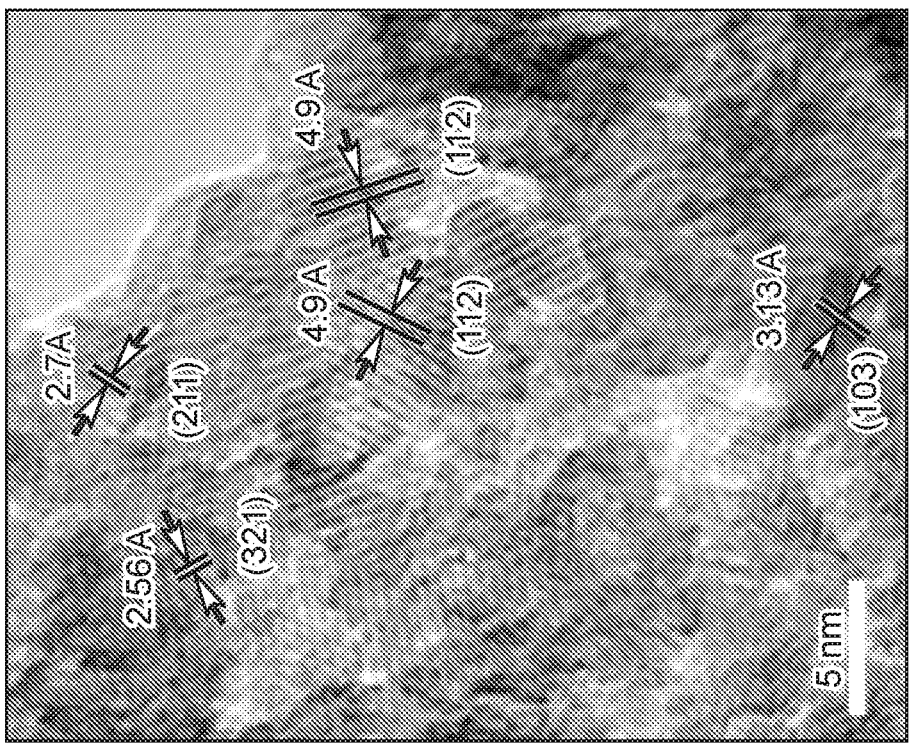
Figure 18B:
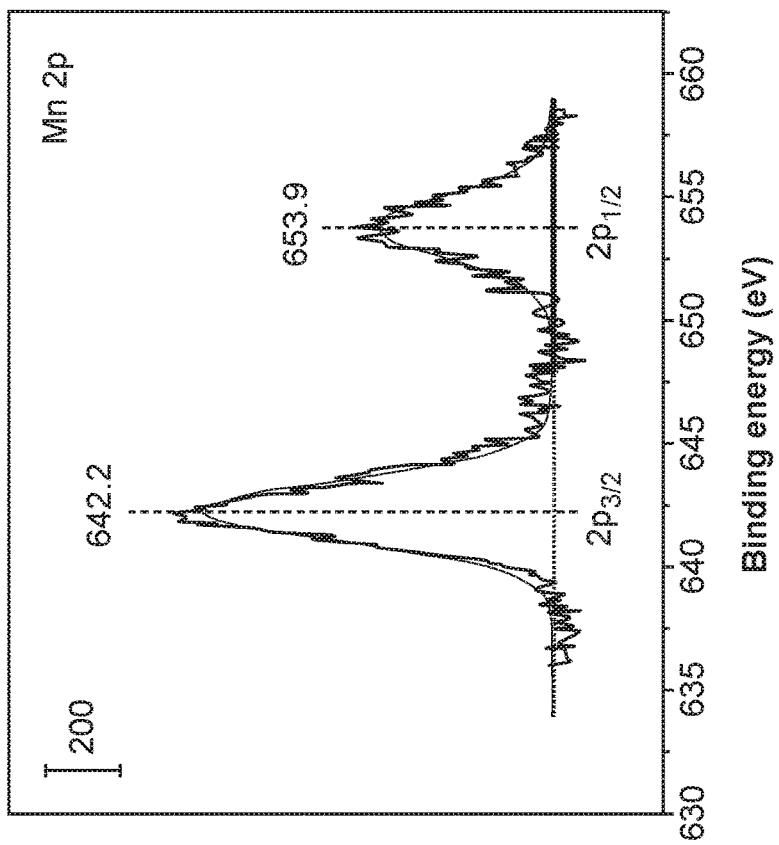
FIG. 18a shows Mn and FIG. 18b shows Zn.
Figure 18A:
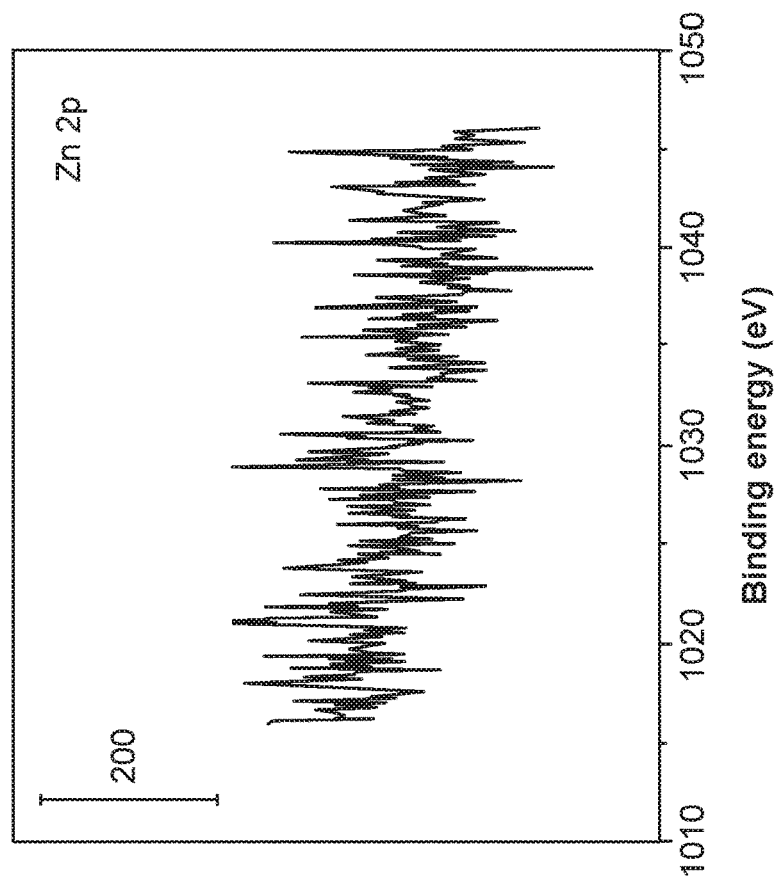
Figure 19A:
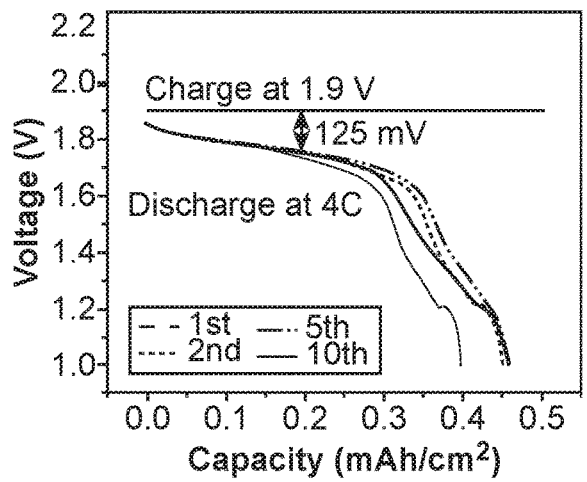
FIG. 19 shows an embodiment of influence of charge voltage on a cell performance. Charge voltage of FIG. 19a is about 1.9 V.
FIG. 19b is about 1.95 V.
FIG. 19c is about 2.0 V
FIG. 19d is about 2.1 V vs. Zn$^{2+}$/Zn under the conditions of discharge rate of about 4 C and end discharge voltage of about 1.0 V vs. Zn$^{2+}$/Zn.
Figure 19B:
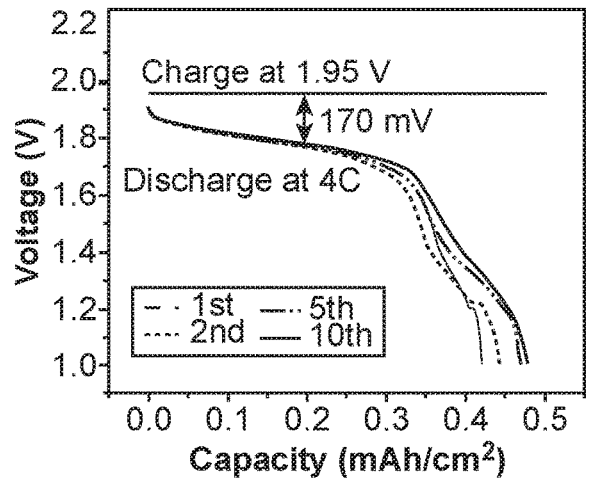
Figure 19C:
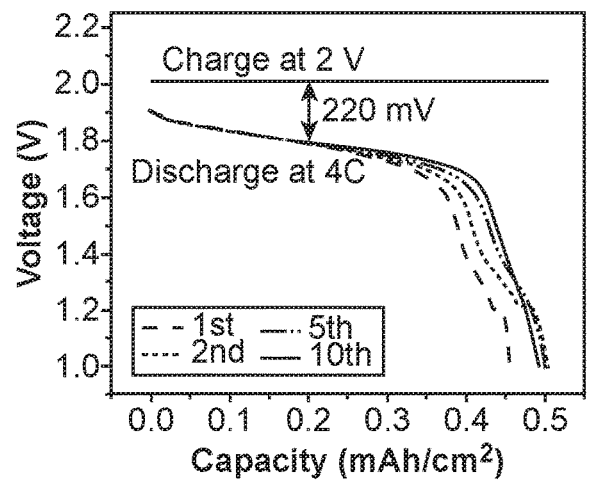
Figure 19D:
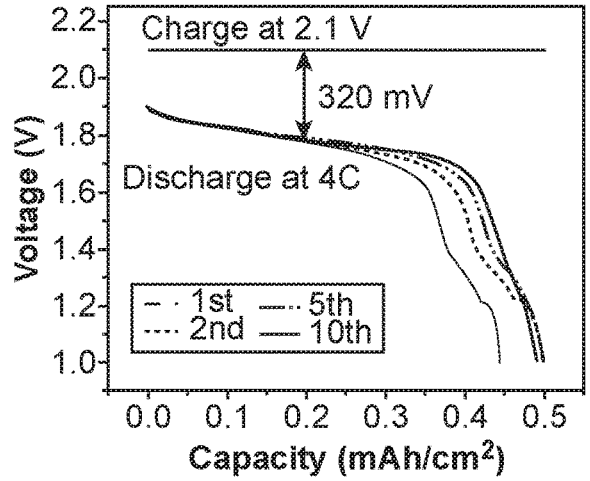
Figure 20A:
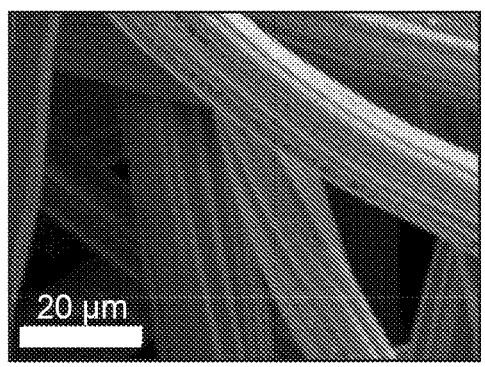
FIG. 20a and FIG. 20b show SEM images for charge at about 1.9 V vs. Zn$^{2+}$/Zn.
Figure 20B:
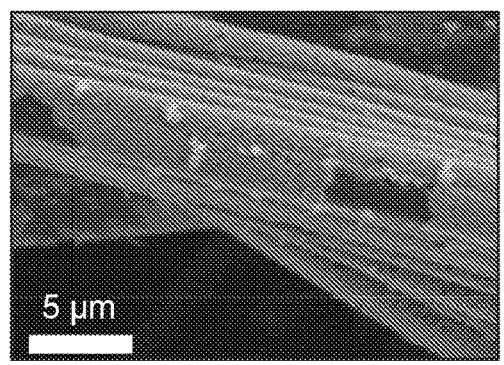
Figure 20C:
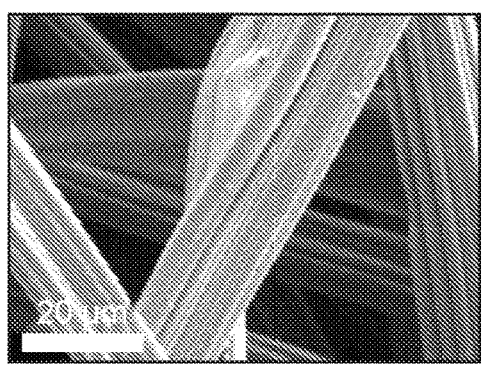
FIG. 20c and FIG. 20d show SEM images for charge at about 1.95 V vs. Zn$^{2+}$/Zn.
Figure 20D:
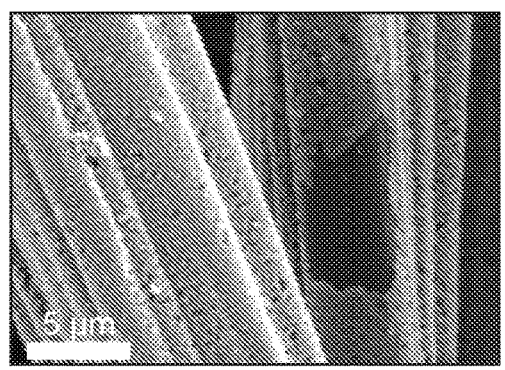
Figure 20E:
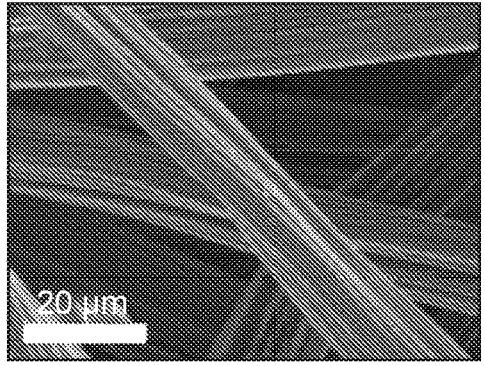
FIG. 20e and FIG. 20f show SEM images for charge at about 2.0 V vs. Zn$^{2+}$/Zn.
Figure 20F:
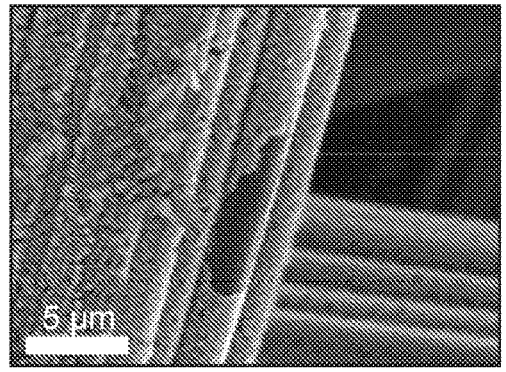
Figure 20G:
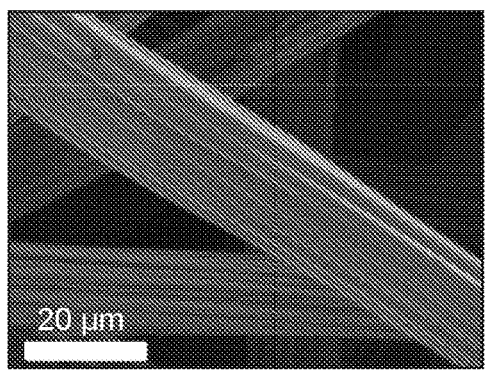
FIG. 20g and FIG. 20h show SEM images for charge at about 2.1 V vs. Zn$^{2+}$/Zn.
Figure 20H:
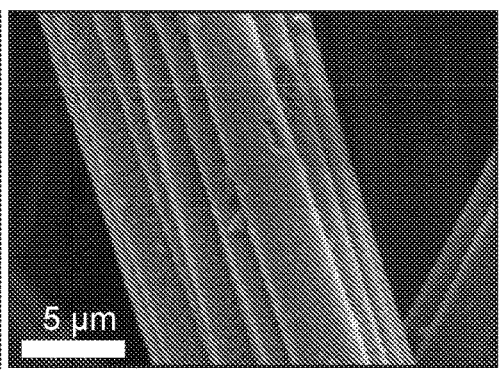

To further understand the electrochemical behavior at low discharge rates, the cathode materials at first discharge end voltages of about 1.4, about 1.3 and about 1.0 V vs. $Zn^{2+}/Zn$ are obtained with a discharge rate of about 0.5 C (FIG. 3a and FIG. 16), and then subjected to XPS characterizations. The results indicate that the mixture of $Mn^{4+}$ and $Mn^{3+}$ ions together with $Zn^{2+}$ ion are present in all the samples (FIGS. 3c and d). Furthermore, with decreasing the discharge end voltage, peak intensities of $Mn^{3+}$ and $Zn^{2+}$ ions become stronger and stronger, indicating that more $Zn^{2+}$ ions can intercalate into $MnO_2$ crystal structure. High-resolution transmission electron microscopy (HR-TEM) image and Energy-dispersive X-ray spectroscopy (EDX) measurements show that the obtained sample has high crystallinity with interplanar spacings of about 0.49, about 0.31, about 0.27 and about 0.25 nm, representing the (112), (103), (211) and (321) planes of http://en.wikipedia.org/wiki/Periodic_table_%28crystal_structure%29-Face_centered_cubic_.28cubic_close_packed.29Zn$Mn_2O_4$ (JCPDS No. 24-1133) (FIG. 17). This phenomenon is also consistent with the comparative cells that use $Zn^{2+}$ ion intercalation into cathode $MnO_2$ and allow the cells to work when the aqueous electrolyte contains zinc salts. It is noted that the intercalated $Zn^{2+}$ ion can also be released again at charge to form $MnO_2$ (FIGS. 8 and 18). It is noted that at discharge, the proton $H^+$ and $Zn^{2+}$ ion competitively react with $MnO_2$ to form $Mn^{2+}$ ion and $ZnMn_2O_4$. Furthermore, the former reaction rate is higher than the latter because just dissolution of $MnO_2$ into $Mn^{2+}$ ion is observed at higher discharge rates of about 6 C, about 8 C and about 10 C (FIGS. 3a and b). Therefore, it is of importance to reasonably control the discharge rate in order to achieve high Coulombic efficiency for the cell.

It is also noted that at discharge rates of about 3 C, about 4 C and about 6 C, the initial Coulombic efficiencies are about 89%, about 90% and about 94%, respectively, and the tenth values can reach up to about 100%. With further increasing the discharge rate to about 8 C and about 10 C, the initial Coulombic efficiencies are about 90% and about 88%, respectively, and corresponding tenth values are about 98% and about 94%. Altogether, this redox flow battery can operate very well within a wide range of discharge rate and exhibit excellent discharge behaviors at fast discharge rates.

Effect of Charge and Discharge Voltage on Cell Performance

The influence of charge voltage is also investigated on the cell performance (FIG. 19). The average overpotentials are about 125 mV at about 1.9 V, about 170 mV at about 1.95 V, about 220 mV at about 2.0 V and about 320 mV at about 2.1 V vs. $Zn^{2+}/Zn$, indicating that charge voltage has almost no noticeable effect on the discharge plateaus. However, they have some influences on the Coulombic efficiency. The initial Coulombic efficiencies are about 80% at about 1.9 V, about 88% at about 1.95 V, about 90% at about 2.0 V and about 90% at about 2.1 V, respectively, and corresponding tenth values can reach up to about 90%, about 94%, about 100% and about 100%. The reason for the low Coulombic efficiencies at about 1.9 V and about 1.95 V vs. $Zn^{2+}/Zn$ might be that carbon felt has a relatively smooth surface (FIG. 7), and a higher current density is involved for effective deposition of $MnO_2$ on its surface (FIG. 20). Altogether, the charge voltage of about 2.0 V vs. $Zn^{2+}/Zn$ is more suitable for this aqueous flow battery.

Figure 21A:
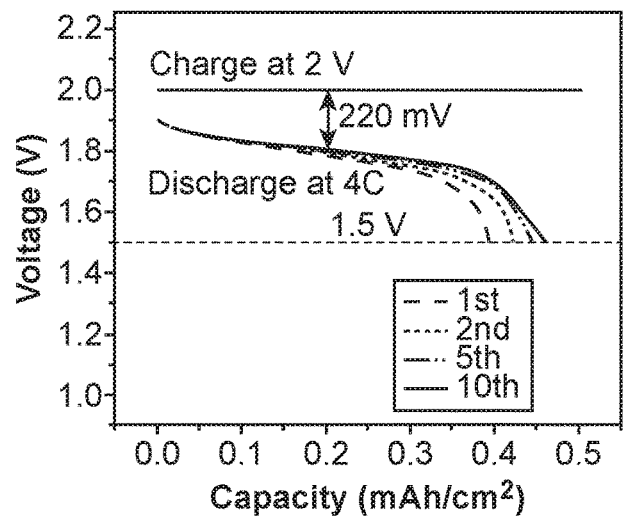
FIG. 21a shows discharge end voltage of about 1.5 V vs. $Zn^{2+}/Zn$.
Figure 21B:
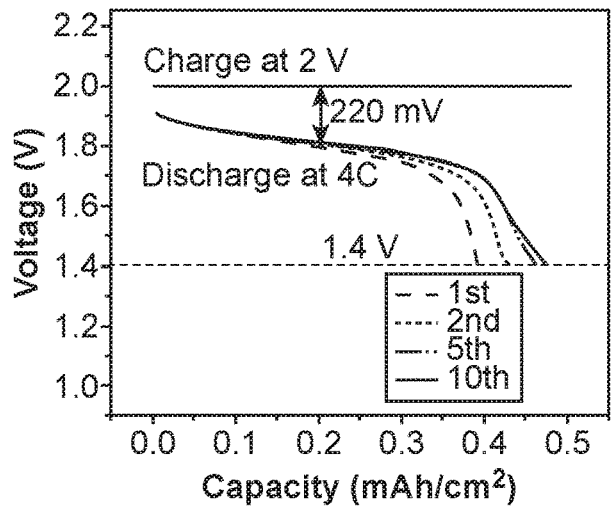
FIG. 21b shows discharge end voltage of about 1.4 V vs. $Zn^{2+}/Zn$.
Figure 21C:
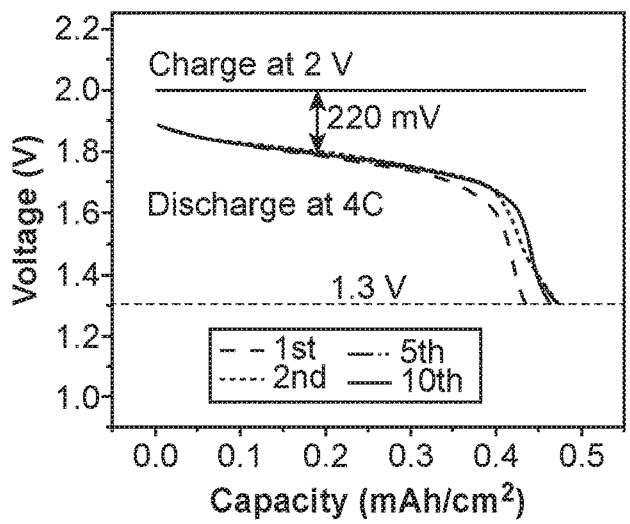
FIG. 21c shows discharge end voltage of about 1.3 V vs. $Zn^{2+}/Zn$.

In addition, the influence of discharge end voltage on the cell performance is also investigated (FIG. 21). When the discharge end voltages are about 1.5, about 1.4 and about 1.3 V vs. $Zn^{2+}/Zn$, just one discharge plateau is found and no noticeable side reaction is observed at a discharge rate of about 4 C; however, the Coulombic efficiency becomes lower and corresponding initial values are about 78%, about 78% and about 87%. This is mainly caused by incomplete dissolution of the formed $MnO_2$ with higher discharge end voltages. It is also noticed that with increasing cycle number, the Coulombic efficiencies can reach up to about 100%, since the more $MnO_2$ left on the carbon felt surface, the more protons are produced in the aqueous solution, which can promote the dissolution of $MnO_2$ into soluble $Mn^{2+}$ ion according to the chemical equilibrium principle (equation 1).

Effect of Active Material Concentration on Cell Performance

Figure 4A:
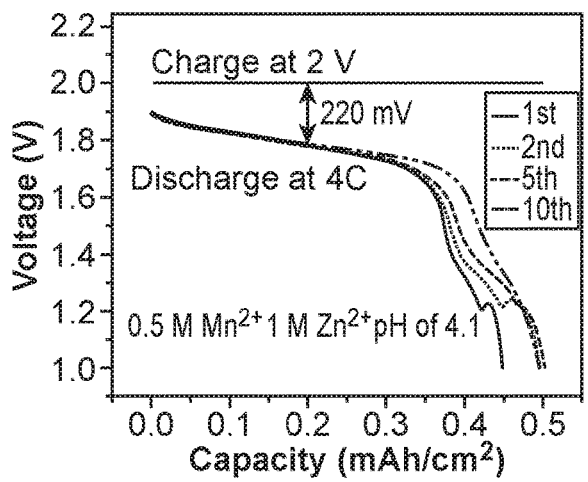
FIG. 4 shows influences of Mn$^{2+}$ ion concentration and pH value on the cell performance of an embodiment. Charge and discharge curves when electrolyte contain FIG. 4a, about 0.5 M Mn$^{2+}$ and about 1 M Zn$^{2+}$ ion with a pH value of about 4.1, and FIG. 4b, about 3 M Mn$^{2+}$ and about 1 M Zn$^{2+}$ ion with a pH value of about 3.0.
FIG. 4c, FIG. 4d, Charge and discharge curves when adding concentrated sulfuric acid (H$_2$SO$_4$) to adjust the pH value of electrolyte to about 2.2 and about 1.8.
Figure 4B:
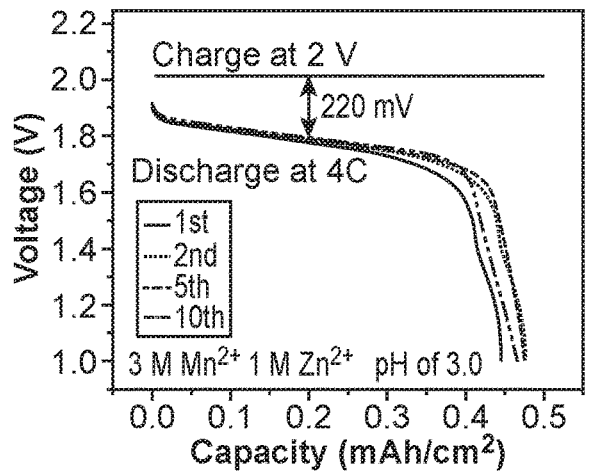
Figure 4C:
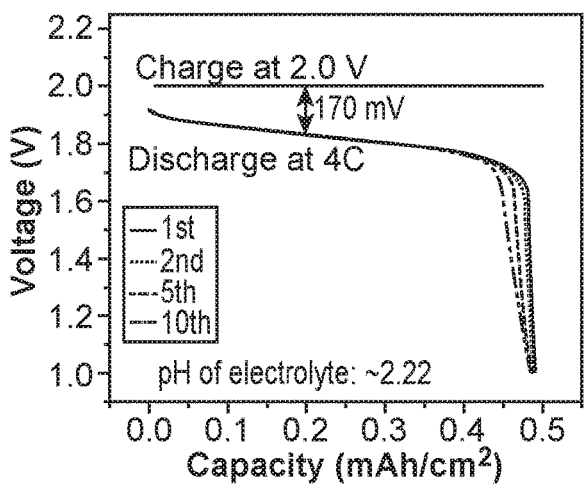
Figure 4D:
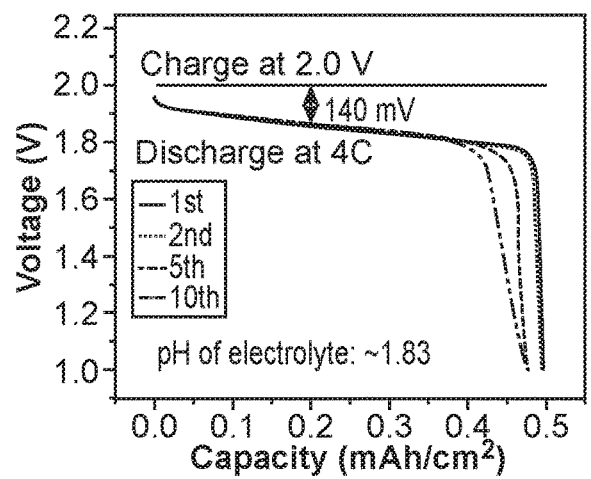
Figure 22A:
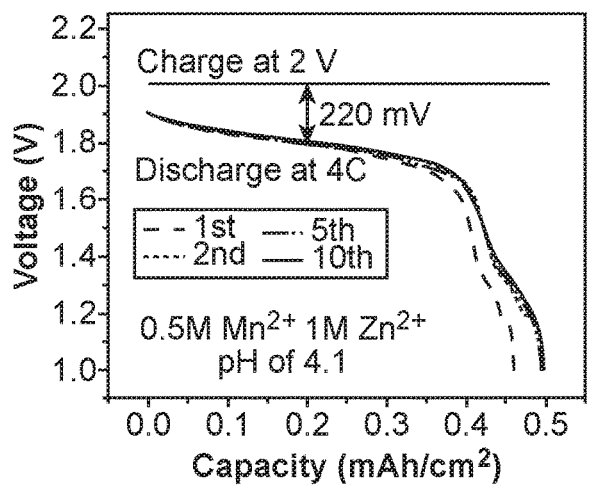
FIG. 22a shows about 0.5 M $Mn^{2+}$ and about 1 M $Zn^{2+}$ ion, pH value of electrolyte: about 4.1.
Figure 22B:
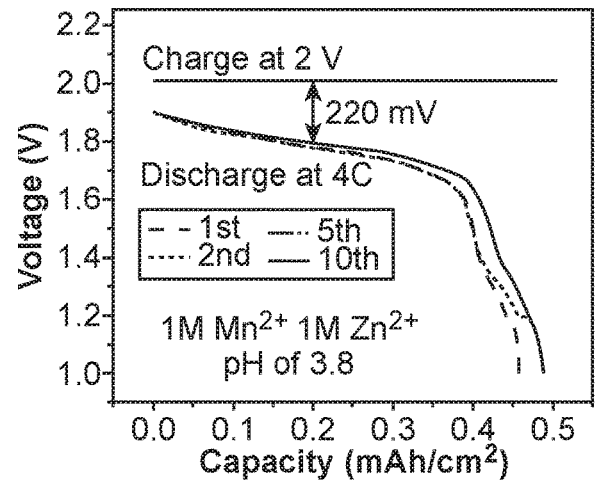
FIG. 22b shows about 1 M $Mn^{2+}$ and about 1 M $Zn^{2+}$ ion, pH value of electrolyte: about 3.8.
Figure 22C:
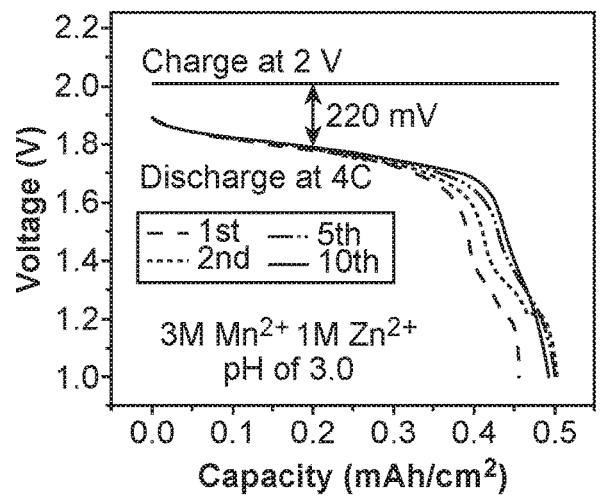
FIG. 22c shows about 3 M $Mn^{2+}$ and about 1 M $Zn^{2+}$ ion, pH value of electrolyte: about 3.0.

FIGS. 4a and b show the influence of $Mn^{2+}$ ion concentration on the cell performance (FIG. 22). When $Mn^{2+}$ ion concentrations are about 0.5 M (pH of about 4.1) and about 1 M (pH of about 3.8), the charge and discharge behaviors are similar, and the initial Coulombic efficiency is about 90% and subsequent values can be increased to about 100%. However, with further increasing its concentration to about 3 M (pH of about 3.0), the average discharge plateaus of about 1.78 V vs. $Zn^{2+}/Zn$ becomes shorter with increasing cycle number and the other discharge plateau at low voltage disappears. The similar phenomenon is also observed when fixing $MnSO_4$ concentration at about 1 M and changing $ZnSO_4$ concentration from about 0.5 M (pH of about 4.3) to about 3.0 M (pH of about 3.2) (FIG. 23). These may be relevant with various pH values of different aqueous solutions, because at discharge, protons react with $MnO_2$ to produce $Mn^{2+}$ ion (equation 1). To confirm this, the influence of pH value on the cell performance is investigated via adding concentrated sulfuric acid ($H_2SO_4$) into the electrolyte with pH value of about 3.8. When the pH value is adjusted to about 2.2 and about 1.8, the discharge plateau at higher voltage becomes shorter and the other one at lower voltage disappears, both of which further confirm the presence of competitive reaction of proton and $Zn^{2+}$ ion with $MnO_2$ at discharge. Furthermore, the average overpotential becomes smaller with decreasing pH value, and they are about 170 mV at the pH of about 2.2 and about 140 mV at the pH of about 1.8, indicating that more protons can promote the dissolution of $MnO_2$ and reduce the overpotential of this cell (equation 1). Therefore, it is of importance to control the pH value of electrolyte in a reasonable range.

Scale Up of $Zn/MnO_2$ Flow Battery

Figure 5A:
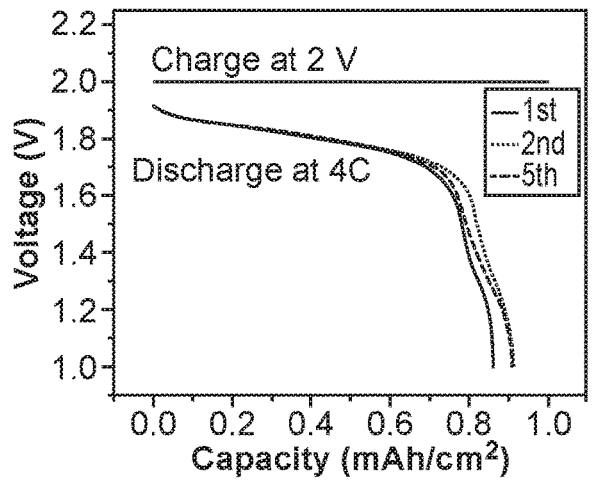
FIG. 5a shows charge and discharge curves at a specific capacity of about 1 mAh/cm$^2$.
Figure 5B:
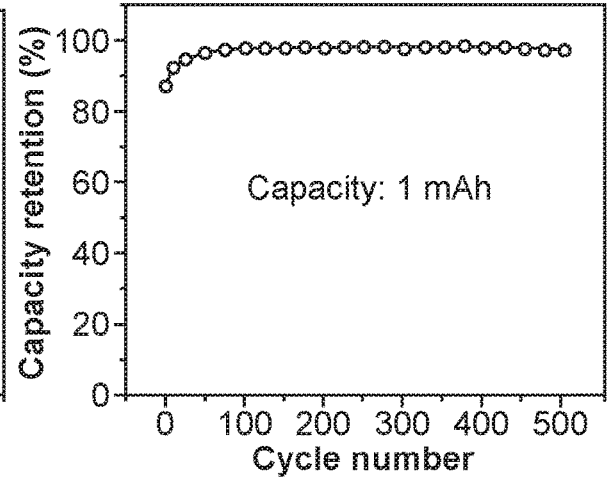
FIG. 5b shows corresponding capacity retention over 500 cycles.
Figure 5C:
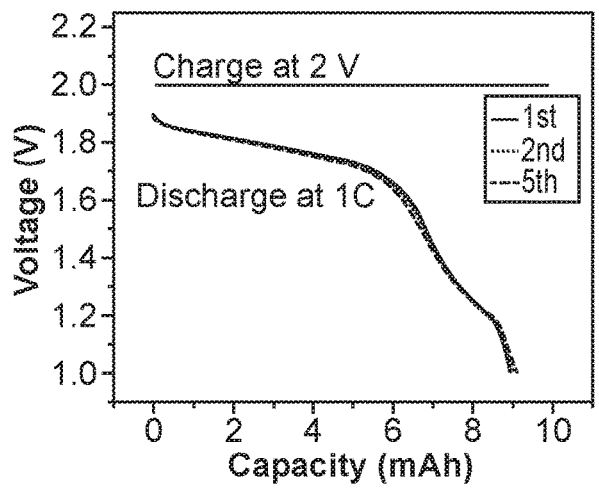
FIG. 5c shows charge and discharge curves at a capacity of about 10 mAh (carbon felt area: about 10 cm$^2$)
Figure 5D:
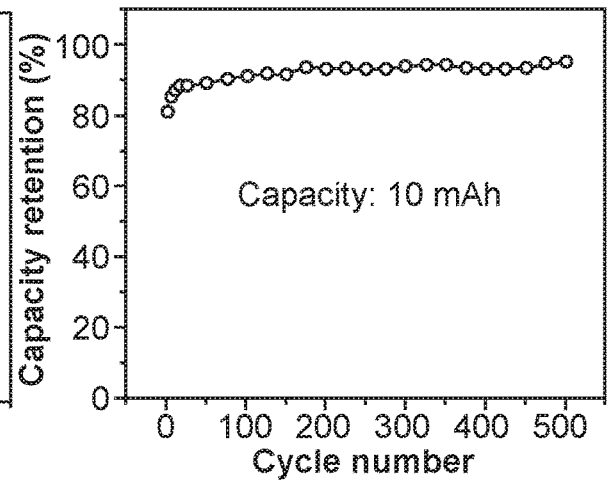
FIG. 5d shows corresponding capacity retention over 500 cycles (data shown in FIG. 5b, FIG. 5d with an interval of 25 cycles).
Figure 25A:
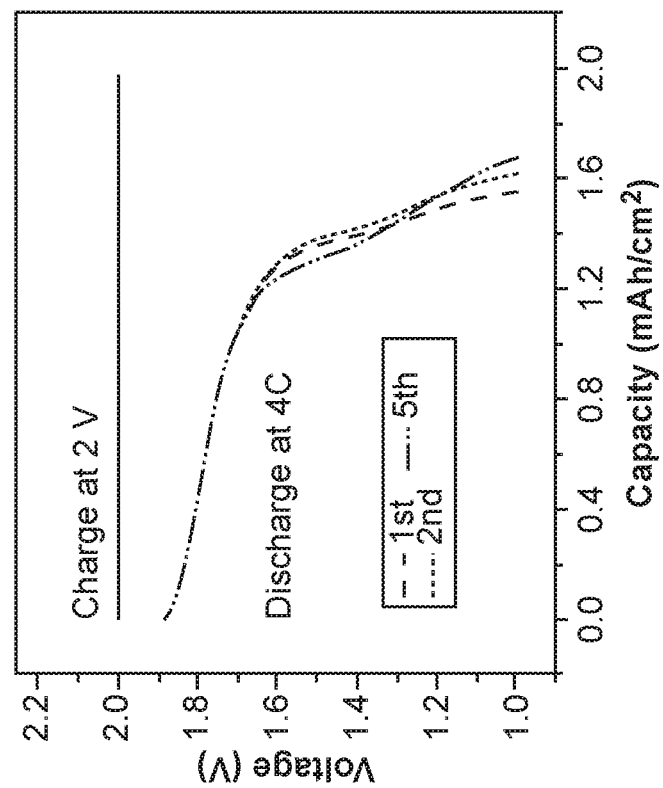
FIG. 25a shows charge and discharge curves at a specific capacity of about 2 mAh/cm².
Figure 25B:
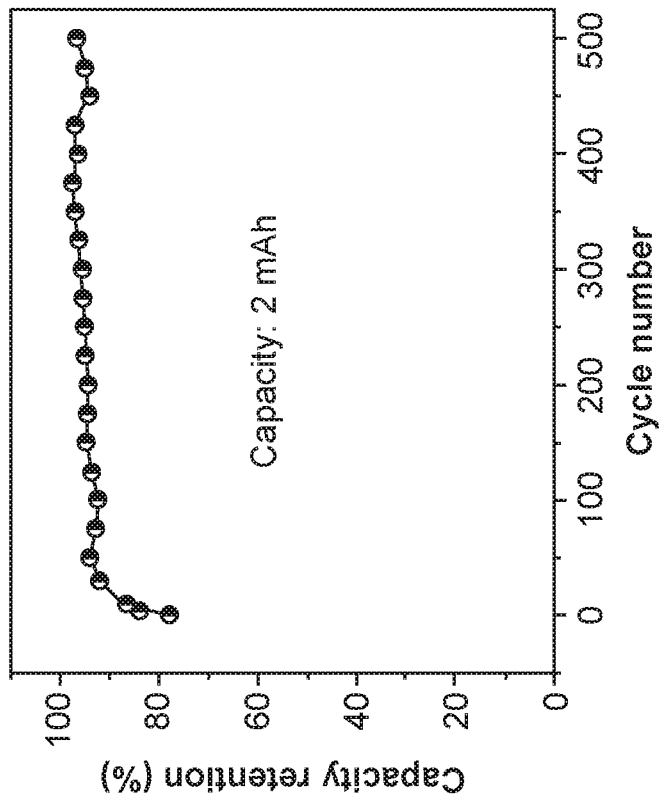
FIG. 25b shows corresponding capacity retention over 500 cycles (data shown with an interval of 25 cycles).
Figure 26B:
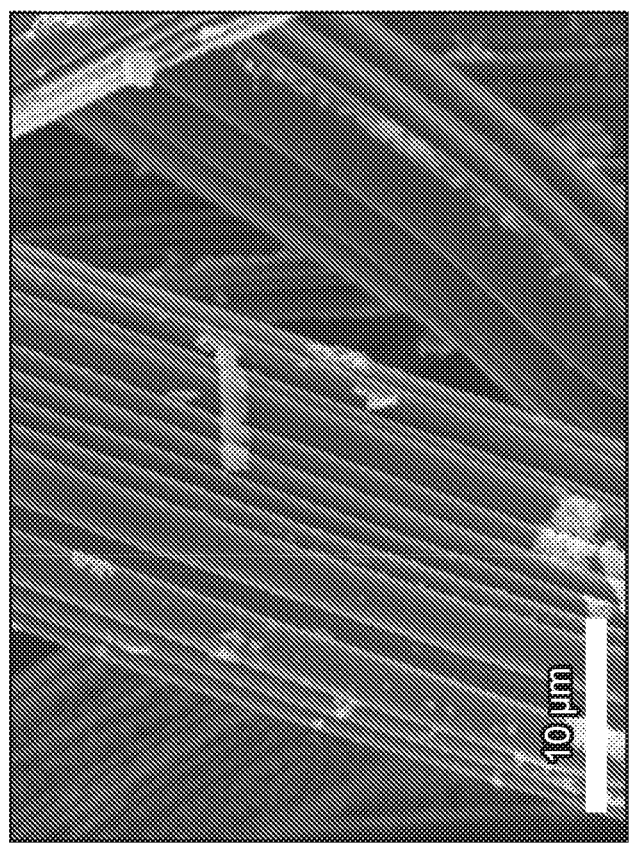
FIG. 26a shows Charge the cell to about 2 mAh/cm² at first cycle and FIG. 26b shows after first discharge process.
Figure 26A:
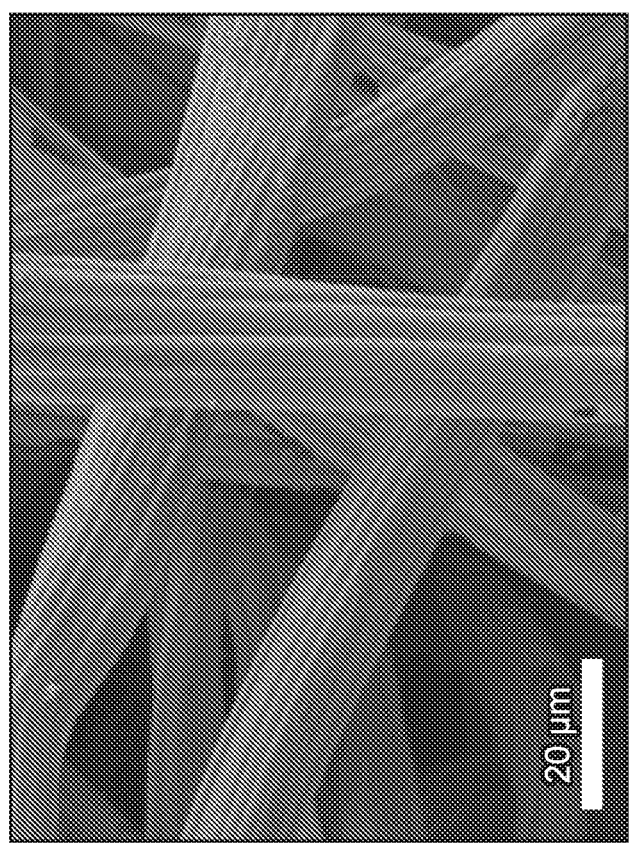

To satisfy high demand for energy storage, it is desired to enlarge the specific capacity of per unit ($cm^2$). The specific capacity of this cell is increased from about 0.5 to about 1.0 and about 2.0 $mAh/cm^2$. At a specific capacity of about 1.0 $mAh/cm^2$, the initial Coulombic efficiency is about 87% (FIG. 5a). With increasing cycle number, the Coulombic efficiency is gradually enhanced and finally is kept at about 97% over 500 cycles without any noticeable capacity decay (FIG. 5b, and FIG. 24). Similarly, at a specific capacity of about 2 $mAh/cm^2$, the initial Coulombic efficiency is about 78% and then it can be increased to about 95%. Furthermore, it can be kept at this value over 500 cycles without any noticeable capacity decay (FIGS. 25 and 26). To further increase absolute energy output, the immersed area of current collector is increased from about 1.0 to about 10.0 $cm^2$. When the total capacity is set as about 5 and about 10 mAh, respectively, and corresponding initial Coulombic efficiencies are about 91.6% and about 89.3% (FIG. 27a and FIG. 5c). With increasing cycle number, the Coulombic efficiencies can be increased and kept at about 95% for about 5.0 mAh over 500 cycles (FIG. 27b) and about 93% for about 10.0 mAh over 500 cycles without any noticeable capacity decay (FIG. 5d).

Figure 28D:
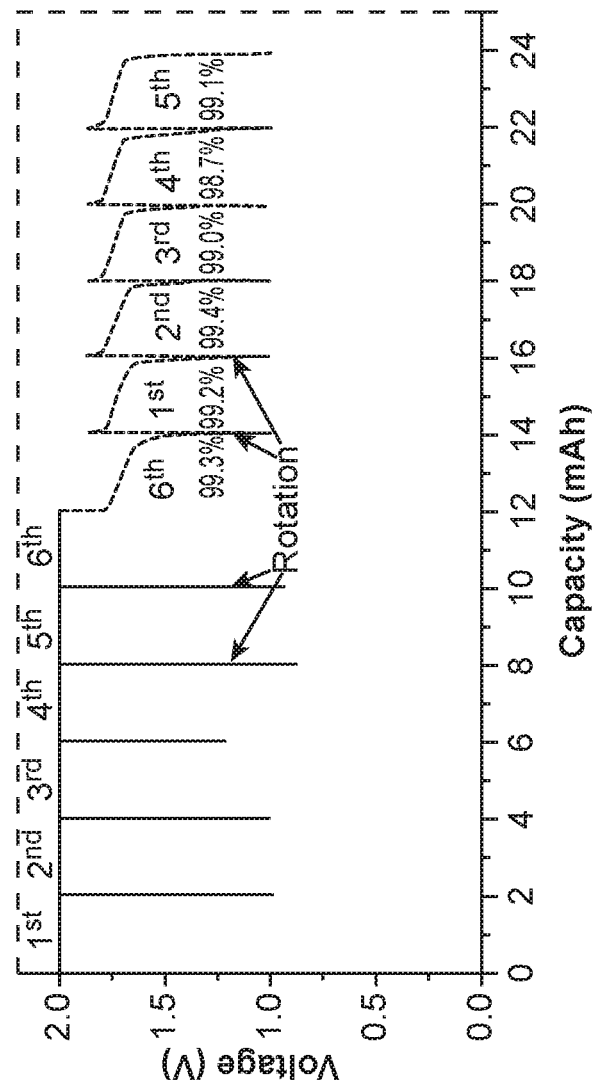
FIG. 28d shows charge-discharge curves when charging at 2 V for 2 mAh per carbon felt cathode and discharging at 1 mA to 1 V.

In addition, another scale up strategy that transports active material via rotation of carbon felt electrode is applied for this novel redox flow battery, in which a hexagonal substrate for the decoupling of energy and power demonstration is used (FIG. 28a). The cathode of the rotating cell was built by affixing six 1 $cm^2$ carbon cathodes (6.35 mm in thickness, the same as the one used in the other cells) onto six sides of a stainless steel hexagon rotator, with 2 cm in length and 1.5 cm in width for each side. The carbon felts were affixed onto hexagon substrates by graphite emulsion and heating of the substrate at 150° C. for 4 hours to cure the binder. The hexagon substrate was partially immersed into the electrolyte to keep only one of the six electrodes soaked. After each charging/discharging, the substrate was clockwisely rotated 60 degree to get the charged/discharged electrode out and rolling another electrode into the electrolyte (FIG. 28b). When charged at constant voltage of 2.0 V and discharged at constant current of 1 mA for each electrode, the whole set of the six electrodes was charged for 6 mAh and it achieved discharge capacity of 5.91 mAh with a total Coulombic efficiency of 98.5% (FIG. 28c). Furthermore, after successive 20 cycles, this rotation cell exhibited excellent stability with Coulombic efficiency of 98.5%. Further increasing the capacity up to 2 mAh for each cathode collector, the whole cell was charged to a capacity of 12 mAh and it delivered discharge capacity of 11.9 mAh, with a total Coulombic efficiency of 99.1% (FIG. 28d). The above rotational cell demonstrated the decoupling of energy and power of the rechargeable $Zn/MnO_2$ flow system and the scaling of the capacity by a simple rotation cathode.

Based on above, to further demonstrate the benefits and potential of this redox flow battery for grid scale energy storage, fabrication of a bench-scale cell of about 1.2 Ah is performed, which was constructed by 6 Zn foils (about 7.1×about 7.1 $cm^2$) as anodes, 5 carbon coated Ti mesh as cathode current collectors, 10 carbon felts (about 7.1×about 7.1 $cm^2$) as cathodes, 10 poly(methyl methacrylate) (PMMA) water-diversion channels, and a PMMA box of about 1.02 L (FIG. 6a and Table 2). The electrode plates stand upright and are substantially parallel with each other. The cathode and anode plates are separated by about 2.0 mm gap of upward-flowing electrolyte created with the about 2.0 mm thick PMMA dowel rods (FIG. 6b). The electrode plates were sealed inside the PMMA box filled with electrolyte, which was pumped into the bottom of this box by a motor drive impeller, causing the electrolyte to flow upward between the electrode plates and then circulated through the pump again (green arrows in FIG. 6c). At the top of these channels, the flow was restricted by a narrow gap, which homogenized the flow of electrolyte with the same velocity in each channel. The pumping of the electrolyte ensures the flow rate of about 0.4 cm $s^{-1}$ on the electrode surface, which is comparable to the value in other reported flow cells. The two terminal ports on the top lid were collected directly from Zn foil and carbon coated Ti mesh for energy storage tests. The result demonstrates that when the cell is charged to about 1.2 Ah and then discharged at the current rate of about 500 mA, the discharge capacity is about 1.104 Ah and corresponding Coulombic efficiency is about 92.0%. Moreover, cycling test shows that when the bench scale cell is charged to about 1.2 Ah and then discharged at about 1000 mA, the Coulombic efficiency is about 89.7% after 500 cycles. This indicates the longevity of this approach. After cycling test, it is found neither apparent passivation of the electrodes (no huge voltage drops during discharge) nor zinc particulates that obstructed the gap between the electrodes, ensuring the long cycle life.

Altogether, the energy output of the redox flow $Zn/MnO_2$ battery can be readily scaled up by increasing either the specific capacity or the working area of electrodes, both of which exhibit excellent cycling stability. Further, it is desirable to optimize potential current collectors with high specific surface area, good conductivity and excellent hydrophilicity for large-scale energy storage.

In summary, fabrication is performed of a membrane-free aqueous $Zn/MnO_2$ flow battery by using $MnSO_4$ solution as a catholyte and metallic Zn foil as an anode. At the cathode side, $Mn^{2+}$ ions are transformed into $\gamma$-$MnO_2$ at charge, and reversibly dissolve into $Mn^{2+}$ ions at discharge. At the anode side, reversible transformation between Zn and $Zn^{2+}$ ion occurs on Zn foil surface. Furthermore, $Zn^{2+}$ ions against protons competitively react with $MnO_2$ at low discharge rate. Impressively, this aqueous flow battery exhibits a high discharge voltage of about 1.78 V, good rate capability (from about 0.5 C to about 10 C) and excellent capacity retention of about 100% over 1000 cycles for about 0.5 mAh/cm², and about 95% over 500 cycles for about 2 mAh/cm². The scale up on absolute energy output is also evidenced by a bench scale cell of about 1.2 Ah with good capacity retention over 500 cycles. This approach provides a foundation for developing the next-generation low cost and safe energy storage system for grid-scale application.

Methods

Chemicals. $MnSO_4 \cdot H_2O$ (≥about 99%) and $ZnSO_4 \cdot 7H_2O$ (≥about 99%) were purchased from Sigma-Aldrich. Carbon felt (about 6.35 mm in thickness with the purity of about 95%) and Zn foil (about 0.1 mm in thickness with the purity of about 99.98%) were purchased from Alfa Aesar. All chemicals were used directly without further purification. Ultrapure water (about 18 MΩ) used in the experiments was supplied by a Millipore System (Millipore Q).

Characterization. X-ray diffraction was conducted by PANalytical X'Pert diffractometer using copper K-edge X-rays. X-ray photoelectron spectroscopy (XPS) was performed on SSI S Probe XPS spectrometer with Al Kα source. SEM (FEI XL30 Sirion) and TEM (FEI Tecnai G2 F20 X-TWIN) were used to characterize the sample morphology and micro structure.

Electrochemical measurements. Galvanostatic experiments were performed using multi-channel potentiostat, VMP3 (Bio-Logic). The rechargeable $Zn/MnO_2$ battery is constructed by an aqueous electrolyte containing about 1 M $MnSO_4$ and about 1 M $ZnSO_4$ (pH value of about 3.8), a blank carbon felt (about 6.35 mm in thickness) as a current collector at cathode side, a Zn foil anode (about 100 μm in thickness), and with no separator between the two electrodes. The electrodes are both rectangles (about 1×about 2 cm²) and half-immersed into electrolyte in a round, Pyrex glass vial, and an inter-electrode gap is about 4 mm. The conductive electrode area in contact with the electrolyte is about 1 cm² and the upper halves of the electrodes not in contact with the electrolyte are connected to titanic wire current collectors. The carbon felt is subjected to wash with methanol and ultrapure water before experiments. The influences of charge voltage and discharge voltage, discharge rate capability, $Mn^{2+}$ and $Zn^{2+}$ ion concentration, pH value on the cell performances were also investigated. All electrochemical measurements were carried out in the Pyrex glass vial.

Additional Information

TABLE 1

Theoretical volumetric energy densities of aqueous rechargeable $Zn/MnO_2$ flow batteries.

| Concentration of aqueous electrolyte | Volumetric energy density (Wh L⁻¹) |
|---|---|
| 0.5M $MnSO_4$ and 0.5M $ZnSO_4$ | 46.4 |
| 1.0M $MnSO_4$ and 1.0M $ZnSO_4$ | 92.7 |
| 1.5M $MnSO_4$ and 1.5M $ZnSO_4$ | 139.1 |
| 2.0M $MnSO_4$ and 2.0M $ZnSO_4$ | 185.5 |
| 2.5M $MnSO_4$ and 2.5M $ZnSO_4$ | 231.8 |
| 3.0M $MnSO_4$ and 3.0M $ZnSO_4$ | 278.2 |
| 4.0M $MnSO_4$ and 4.0M $ZnSO_4$ (Saturated) | 370.9 |

The energy density of a redox flow battery is determined by the number of transferred electrons, the concentration of active species in the electrolyte, and the cell voltage, as be described by eq 1.

$$E = \frac{n_c C_c FV}{1 + \frac{n_c C_c}{n_a C_a}} = \frac{n_a C_a FV}{1 + \frac{n_a C_a}{n_c C_c}} \qquad \text{eq 1}$$

where $n_c$ and $n_a$ are the number of electrons involved in the redox reactions on the cathode and anode, respectively, $C_c$ and $C_a$ are maximum concentrations of the less soluble of charged and discharged active redox species in catholyte and anolyte, respectively, F is the Faraday constant (26.8 Ah/mol), and V is the voltage of the cell. For the membrane-free $Zn/MnO_2$ flow battery, where catholyte and anolyte concentrations equals with each other, and the volumetric energy density of the cell is determined by the lesser one between the two ions (eq 2). C is the concentration of the lesser one and n is 2.

$$E = nCFV \qquad \text{eq 2}$$

The calculation of the theoretical volumetric energy densities of $Zn/MnO_2$ flow batteries as a function of its concentration is listed in Table 1. The calculation is based on the solution of $MnSO_4$ and $ZnSO_4$ in water at room temperature (about 25° C.) and a discharge potential of about 1.73 V at about 4 C rate (FIG. 1c).

TABLE 2

Bench scale cell design.

| Design parameter | Value |
|---|---|
| Electrode size | 71 * 71 mm |
| Number of anodes | 6 |
| Number of carbon coated Ti mesh | 5 |
| Number of cathodes | 10 |
| Anode material | 0.2 mm thick Zn foil |
| Gap between electrodes | 2.0 mm |
| Cathode material | 2.5 mm thick Carbon felt |
| Electrolyte volume | 0.52 L |
| Concentration in electrolyte | 1.0M $MnSO_4$ and 1.0M $ZnSO_4$ |

TABLE 2-continued

Bench scale cell design.

| Design parameter | Value |
| --- | --- |
| Flow velocity upward between electrode plates | 0.4 cm s$^{-1}$ |

Cyclic voltammogram (CV) obtained via two electrode test shows that redox peaks are observed, indicating the occurrence of electrochemical deposition and dissolution of $MnO_2$. Moreover, the electrochemical deposition of $MnO_2$ may occur at about 1.9 V vs. $Zn^{2+}/Zn$ (FIG. 8). The deposition peak is about 2.4 V $Zn^{2+}/Zn$, and no noticeable $O_2$ evolution is found. The reduction peak at about 1.78 V vs. $Zn^{2+}/Zn$ should be ascribed to dissolution of $MnO_2$ into $Mn^{2+}$ ion, while at about 1.2 V vs. $Zn^{2+}/Zn$, the intercalation of Zn ion into the undissolved $MnO_2$ occurs. It is also noticed that another oxidation peak at about 1.64 V vs. $Zn^{2+}/Zn$ should be ascribed to the deintercalation of Zn ion from the formed $Zn_xMn_{2-x}O_4$ to generate $MnO_2$ again.

HR-TEM image exhibits high crystallinity with interplanar spacing of about 0.258 nm, representing the (031) planes of http://en.wikipedia.org/wiki/Periodic_table_%28crystal_structure%29-Face_centered_cubic_.28cubic_close_packed.29γ-$MnO_2$. EDX spectrum further confirms that Mn and O elements are solely present in the sample after first charge and without any noticeable Zn element.

The cyclic voltammetric experiments via three electrodes indicate that the working potential window is about 2.35 V for redox reactions of $Mn^{2+}$ and $Zn^{2+}$ ions during the charge and discharge processes and no noticeable $H_2$ and $O_2$ evolution is observed (FIG. 12).

After 1000 cycles, most of the deposit has dissolved into soluble $Mn^{2+}$ ions, but some poorly conducting solid clearly remains in patches on the carbon felt surface.

As for Zn foil anode, its original flat surface is dramatically changed and some nanoflakes are formed with no noticeable Zn dendrites (FIG. 14). However, Zn is solely present and no side products are observed, indicating that the transformation between Zn and $Zn^{2+}$ ion occurs during the cycling.

At the discharge rates of about 0.5 C, about 1 C, and about 2 C, all the curves exhibit similar characteristics and two continuous discharge voltage plateaus are observed. One plateau is with the average discharge voltage of about 1.78 V vs. $Zn^{2+}/Zn$, and the average potential for the other plateau is dependent on the discharge rate, such as about 1.3 V at about 0.5 C, about 1.25 V at about 1 C and about 1.2 V at about 2 C. The initial Coulombic efficiencies are about 60%, about 80% and about 85%, respectively, and the tenth values are about 68%, about 85% and about 91%. With increasing the discharge rate to about 3 C and about 4 C, the first discharge plateau becomes longer and the second discharge plateau becomes shorter. Furthermore, when the discharge rates are about 6 C, about 8 C and about 10 C, just one plateau at high discharge voltage is observed, indicating that dissolution of $MnO_2$ into soluble $Mn^{2+}$ ion occurs at discharge.

It can be seen from FIG. 16 that when the discharge end voltage is about 1.4 V vs. $Zn^{2+}/Zn$, the formed $MnO_2$ is dissolved gradually and some blank carbon felt is observed. With decreasing the discharge end voltage, more blank carbon felt is observed, and at the voltage of about 1 V vs. $Zn^{2+}/Zn$, small amount of samples is left on the surface, which is more than that obtained at a discharge rate of about 4 C (FIG. 2d).

HR-TEM image exhibits high crystallinity with interplanar spacings of about 0.49, about 0.313, about 0.27 and about 0.256 nm, representing the (112), (103), (211) and (321) planes of http://en.wikipedia.org/wiki/Periodic_table_%28crystal_structure%29-Face_centered_cubic_.28cubic_close_packed.29$ZnMn_2O_4$ (JCPDS No. 24-1133). EDX spectrum further confirms that Zn, Mn and O elements are present in the sample.

The average overpotentials are about 125 mV at about 1.9 V, about 170 mV at about 1.95 V, about 220 mV at about 2.0 V and about 320 mV at about 2.1 V vs. $Zn^{2+}/Zn$, indicating that charge voltage has almost no effect on the discharge plateaus. However, they have some influences on the Coulombic efficiency. The initial Coulombic efficiencies are about 80% at about 1.9 V, about 88% at about 1.95 V, about 90% at about 2 V and about 90% at about 2.1 V, respectively, and corresponding tenth values can reach up to about 90%, about 94%, about 100% and about 100%. Therefore, under these conditions the charge voltage of about 2 V vs. $Zn^{2+}/Zn$ is more suitable for this aqueous $Zn/MnO_2$ battery. The reason for the lower Coulombic efficiency at about 1.9 V and about 1.95 V vs. $Zn^{2+}/Zn$ might be that carbon felt has a very smooth surface (FIG. 7), and a higher current density is involved for effective deposition of $MnO_2$ on its surface (FIG. 20).

When the discharge end voltages are about 1.5 V, about 1.4 V and about 1.3 V vs. $Zn^{2+}/Zn$ (FIG. 21), no noticeable side reaction is found at a discharge rate of about 4 C; however, the Coulombic efficiency becomes lower and corresponding initial values are about 78%, about 78% and about 87%. This is mainly caused by incomplete dissolution of the formed $MnO_2$ with higher discharge end voltage.

When $Mn^{2+}$ ion concentrations are about 0.5 M and about 1 M, the charge and discharge behaviors are similar, and the initial Coulombic efficiency is about 90% and subsequent values can be increased to about 100%. However, with further increasing its concentration to about 3 M, the average discharge plateaus of about 1.78 V vs. $Zn^{2+}/Zn$ becomes shorter with increasing cycle number and the other discharge plateau at low voltage disappears.

Figure 23A:
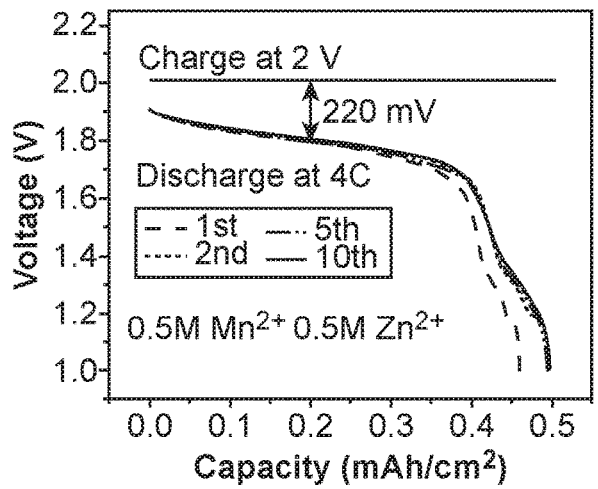
FIG. 23a shows about 0.5 M $Mn^{2+}$ and about 0.5 M $Zn^{2+}$ ion, pH value of electrolyte: about 4.3.
Figure 23B:
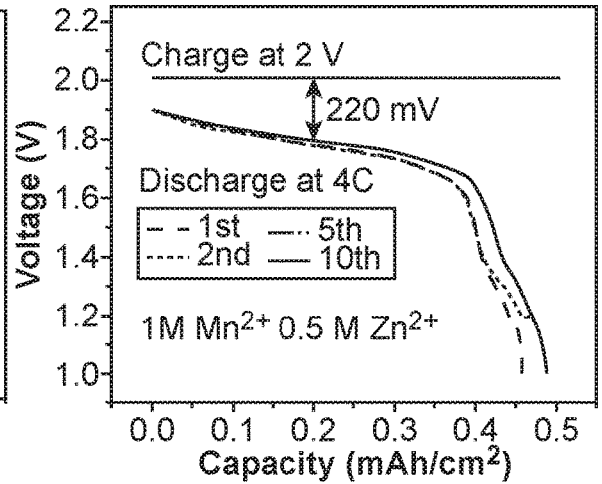
FIG. 23b shows about 1 M $Mn^{2+}$ and about 0.5 M $Zn^{2+}$ ion, pH value of electrolyte: about 4.2.
Figure 23C:
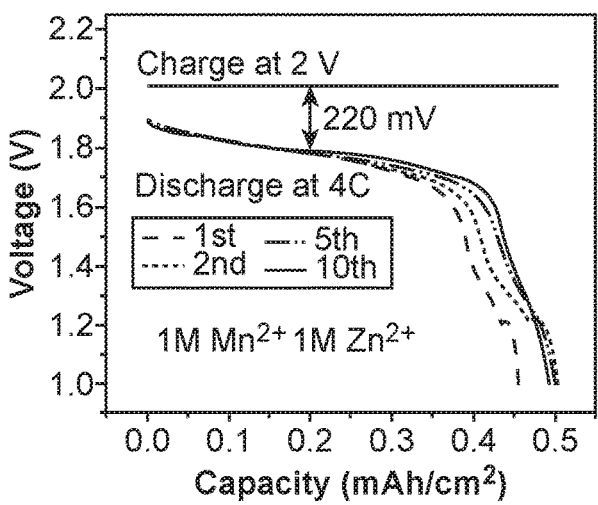
FIG. 23c shows about 1 M $Mn^{2+}$ and about 1 M $Zn^{2+}$ ion, pH value of electrolyte: about 3.8.
Figure 23D:
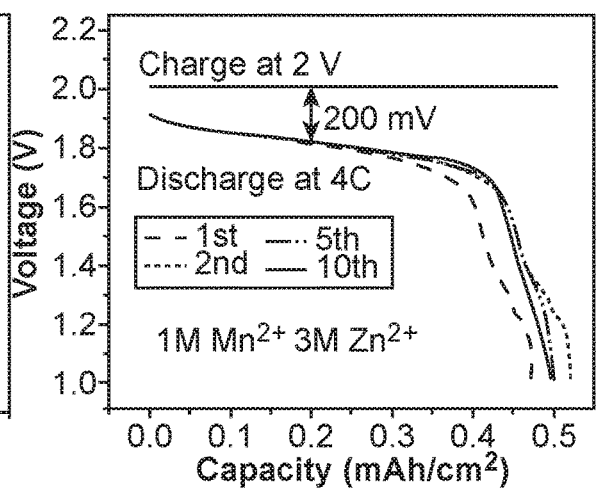
FIG. 23d shows about 1 M $Mn^{2+}$ and about 3 M $Zn^{2+}$ ion, pH value of electrolyte: about 3.2.

When $Zn^{2+}$ ion concentrations are about 0.5 M and about 1 M, the charge and discharge behaviors are the similar, and the initial Columbic efficiency is about 90% and subsequent values can be increased to about 100% (FIGS. 23a, 23b and 23c). However, with further increasing its concentration to about 3 M, the average discharge plateaus of about 1.78 V vs. $Zn^{2+}/Zn$ become short gradually and the second discharge plateau at low voltage disappears (FIG. 23d).

After discharge, most of the deposit has dissolved into soluble $Mn^{2+}$ ions, but some poorly conducting solid clearly remains in patches on the carbon felt surface.

At a specific capacity of about 2 mAh/cm$^2$, the initial Coulombic efficiency is about 78% and then it can be increased to about 95%. Furthermore, it can be kept at this value over 500 cycles without any noticeable capacity decay (FIGS. 25 and 26).

After discharge, most of the deposit has dissolved into soluble $Mn^{2+}$ ions, but some poorly conducting solid clearly remains in patches on the carbon felt surface.

When the total capacity is set as about 5 mAh, the initial Coulombic efficiencies are about 91.6%, (FIG. 27a). With increasing cycle number, the Coulombic efficiencies can be increased and kept at about 95% for about 5 mAh over 500 cycles (FIG. 27b).

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is circular can refer to a diameter of the object. In the case of an object that is non-circular, a size of the non-circular object can refer to a diameter of a corresponding circular object, where the corresponding circular object exhibits or has a particular set of derivable or measurable characteristics that are substantially the same as those of the non-circular object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A redox flow battery comprising:
   a housing;
   a first electrode disposed in the housing, wherein the first electrode comprises one of carbon cloth, carbon paper, or carbon felt and is configured to allow a reversible manganese-based reaction;
   a second electrode disposed in the housing and facing the first electrode, the first electrode is spaced from the second electrode by a gap without an intervening ion selective membrane; and
   a fluid conveyance mechanism connected to the housing and configured to convey an electrolyte across the gap between the first electrode and the second electrode, wherein the electrolyte is conveyed during both a charge and a discharge operation of the redox flow battery to support the reversible manganese-based reaction at the first electrode.

2. The redox flow battery of claim 1, wherein the first electrode is a cathode, and the second electrode is an anode.

3. The redox flow battery of claim 1, wherein the second electrode includes zinc.

4. The redox flow battery of claim 3, wherein the second electrode includes a zinc foil.

5. The redox flow battery of claim 1, wherein the fluid conveyance mechanism includes a container configured to store the electrolyte, and a pump connected between the container and the housing and configured to convey the electrolyte from the container into the housing.

6. A method of operating a redox flow battery, comprising:
   providing a first electrode, wherein the first electrode comprises one of carbon cloth, carbon paper, or carbon felt;
   configuring the first electrode to allow a reversible manganese-based reaction;
   providing a second electrode facing the first electrode, the first electrode is spaced from the second electrode by a gap; and
   conveying, during both a charge and a discharge operation of the redox flow battery, an aqueous electrolyte across the gap between the first electrode and the second electrode, the aqueous electrolyte includes manganese ions and zinc ions, and is configured to support the reversible manganese-based reaction at the first electrode.

7. The method of claim 6, wherein the first electrode is spaced from the second electrode by the gap without an intervening ion selective membrane.

8. The method of claim 6, wherein the first electrode is a cathode, and the second electrode is an anode.

9. The method of claim 6, wherein the second electrode includes zinc.

10. The method of claim 9, wherein the second electrode includes a zinc foil.

11. The method of claim 6, wherein the electrolyte is configured to support reversible precipitation and dissolution of manganese at the first electrode and reversible precipitation and dissolution of zinc at the second electrode.

12. The method of claim 6, wherein a concentration of the manganese ions is in a range of about 0.1 M to about 5 M.

13. The method of claim 6, wherein a concentration of the zinc ions is in a range of about 0.1 M to about 5 M.

14. The method of claim 6, wherein the aqueous electrolyte has a pH of about 7 or below.

15. The redox flow battery of claim 1, wherein the electrolyte comprises $MnSO_4$.

16. The method of claim 6, wherein the electrolyte comprises $MnSO_4$.

\* \* \* \* \*